United States Patent [19]

Shimrock et al.

[11] Patent Number: 4,609,563

[45] Date of Patent: Sep. 2, 1986

[54] METERED CHARGE SYSTEM FOR CATALYTIC COATING OF A SUBSTRATE

[75] Inventors: Thomas Shimrock, Chatham; Victor Rosynsky, Ewing Township, both of N.J.; Theodore M. Caridi, Aurora, Ohio; John M. Collins, Sagamore Hills, Ohio; Michael G. Koubek, Maple Heights, Ohio

[73] Assignee: Engelhard Corporation, Menlo Park, N.J.

[21] Appl. No.: 706,708

[22] Filed: Feb. 28, 1985

[51] Int. Cl.$^4$ .................. B05D 1/18; B05D 3/00; B05D 5/00; C23C 14/00

[52] U.S. Cl. ......................... 427/8; 118/50; 118/50.1; 427/238; 427/243; 427/294; 427/443.2; 502/439; 502/514

[58] Field of Search ................. 118/50, 50.1; 427/243, 427/8, 294, 350, 346, 348, 238, 443.2; 502/439, 514

[56] References Cited

U.S. PATENT DOCUMENTS

| | | |
|---|---|---|
| 596,993 | 4/1984 | Shimrock et al. |
| 3,306,764 | 2/1967 | Lewis et al. ............................ 117/61 |
| 3,948,213 | 4/1976 | Hoyer et al. ........................... 118/50 |
| 3,959,520 | 5/1976 | Hoyer et al. ............................ 427/8 |
| 4,038,939 | 8/1977 | Hoyer et al. ............................ 118/4 |
| 4,039,482 | 8/1977 | Hoyer et al. ................. 252/466 PT |
| 4,066,801 | 1/1978 | Hoyer et al. ............................ 427/8 |
| 4,191,126 | 3/1980 | Reed et al. ............................ 118/50 |
| 4,208,454 | 6/1980 | Reed et al. .......................... 427/238 |
| 4,340,505 | 7/1982 | Dolan ........................... 252/466 PT |
| 4,384,014 | 5/1983 | Young ................................. 427/294 |

Primary Examiner—Michael R. Lusignan

[57] ABSTRACT

Method and apparatus for coating catalytic converter substrates with an exact amount of a precious metal. In the course of operation of the apparatus, a hollow substrate to be treated having opposed open ends is transferred from a starting location such that one end is lowered into a dip pan into which has been introduced a predetermined amount of slurry material containing the precious metal. With the one end immersed in the slurry, a vacuum placed on the other end of the substrate draws up the entire charge of slurry from the dip pan to coat the lower portion of the substrate. Thereafter, the substrate is raised from the dip pan. The vacuum continues to operate to cause the coating to be evenly distributed on all the interior surfaces of the substrate. Then the substrate is rotated and again lowered so that the other end is immersed in another predetermined charge of the slurry and the process is repeated. Thereupon, the substrate is again raised from the dip pan. Again, the vacuum continues to operate for a predetermined period of time to assure even distribution of the coating. Then the substrate is again rotated to its original orientation, and returned to its starting location.

49 Claims, 15 Drawing Figures

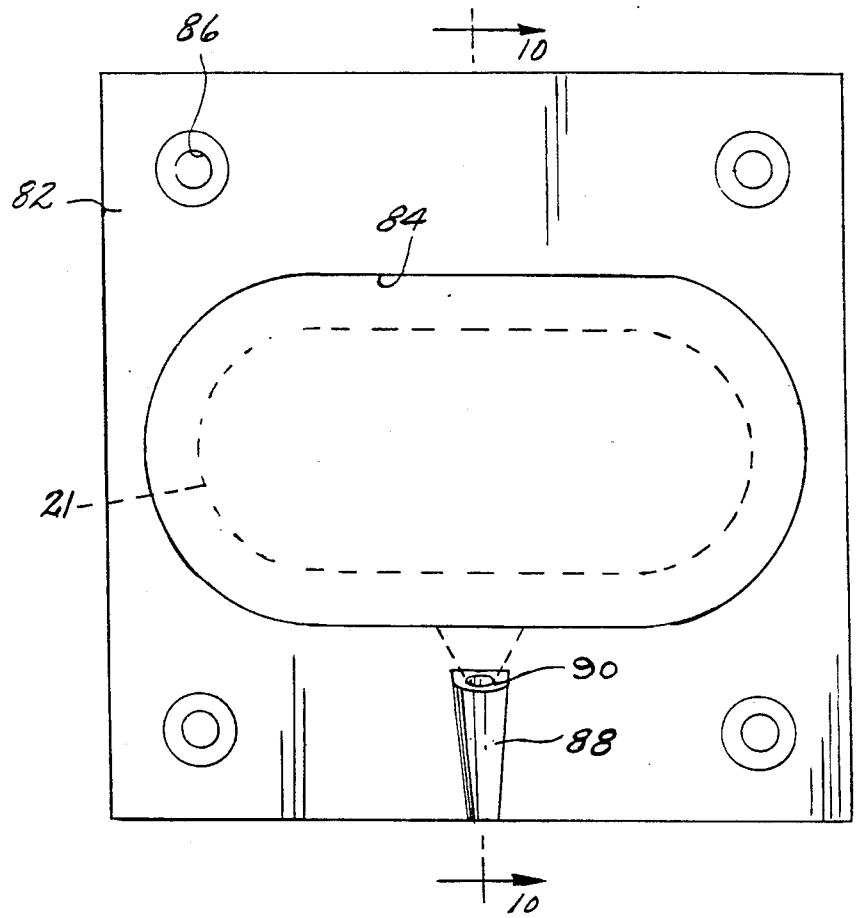
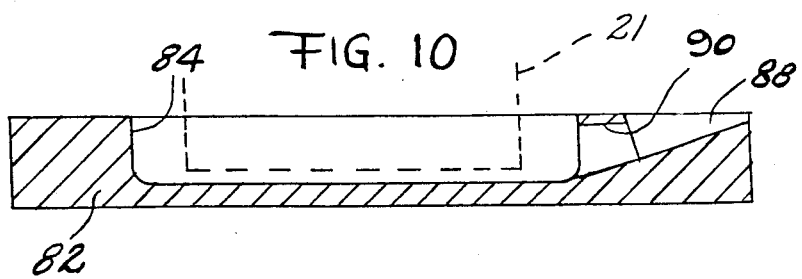

METERED CHARGE SYSTEM FOR CATALYTIC COATING OF A SUBSTRATE

BACKGROUND OF THE INVENTION

I. Field of the Invention

This invention relates to a method and apparatus for the impregnation of ceramic monolithic substrates and, more particularly, to such a method and apparatus which enable the impregnation of the substrate with a predetermined amount of catalyst in an efficient manner and without waste.

II. The Prior Art

The need to remove or convert the noxious components in vehicular exhaust gases is now well known as a means for overcoming air pollution. Also, the present and proposed future requirements for having catalytic exhaust gas converters on motor vehicles are quite well known. One form in which the catalyst for the converters is supplied is as catalytically coated rigid skeletal monolithic substrates, or honeycomb-type elements which are generally cylindrical or oval in shape, where there are a multiplicity of longitudinal passageways in each unit in order to provide a high surface area.

The rigid, monolithic, skeletal substrate structures are typically fabricated from ceramics which comprise refractory crystalline materials such as sillimanite, magnesium silicates, zircon, petalite, spodumene, cordierite, aluminosilicates, mullite, or combinations thereof. Such materials are generally considered to have a porous surface, but to improve the porosity of the surfaces of the skeletal surface, it is generally advisable to provide a highly porous alumina coating over the skeletal structure prior to effecting surface impregnation with a catalytically active material. These monolithic, substantially catalytically inactive skeletal substrate members have been described in prior art patents, as for example in Keith et al U.S. Pat. Nos. 3,331,787 and 3,565,830, such that it is not deemed necessary to describe them in detail herein.

Typically, and by way of example only, the catalytic component will comprise one or more of the noble and base metals and metal oxides of Groups IB, VB, VIIB, and VIII of the Periodic Table, particularly, copper, vanadium, chromium, manganese, iron, cobalt, nickel, platinum, palladium, rhodium, and ruthenium, with one catalytic metal being used singly or in combination with one or more other active metals.

While various methods are known in the art for coating a monolithic support with a refractory coating such as alumina and noble metal catalytic coatings such as platinum, palladium, and rhodium, such methods from the standpoint of cost are deficient in minimizing the amount of coating applied, especially when a costly catalytically active precious metal, e.g. platinum, palladium, or rhodium is codeposited with the high surface area refractory metal.

The instant disclosure reflects the results of continued efforts toward improving the techniques disclosed in copending application of Thomas Shimrock, et al, Ser. No. 596,993, filed Apr. 5, 1984 now U.S. Pat. No. 4,550,034, patented Oct. 29, 1985. That disclosure first presented the need in the art for precisely controlling the amount of alumina and metal catalyst slurries applied to ceramic monolithic catalyst substrates to reduce the amount of excess coating required so that there may result an improvement in efficiency of the process and a reduction in coating material loss.

That copending disclosure listed a number of prior patents and their deficiencies in achieving the goals sought by the present invention. Some additional prior patents should be considered which bear a relationship to the present disclosure. For example, U.S. Pat. No. 3,984,213 to Hoyer et al discloses a treating chamber for applying a coating slurry to a substrate. The slurry is introduced from the top and flows downwardly through the hollow substrate.

U.S. Pat. No. 4,038,939 to Hoyer et al discloses a process of impregnating a substrate by immersion within a treating chamber. It utilizes removal arm means which operate to effect a 90-degree turn of each substrate as it is removed from the treating chamber such that its honeycomb passageways are oriented in a generally horizontal manner to enable air blowing and drying of wet elements and to preclude slurry droplets from blocking the passageways.

According to U.S. Pat. No. 4,191,126 to Reed et al, slurry is applied to a substrate either by dip coating or by applying a coating charge to the upper end of the substrate. It is mentioned in the patent that it may be advantageous, after the substrate has been purged from one end, to invert the substrate and continue the purge from the opposite end.

In U.S. Pat. No. 4,384,014 to Young, there is a disclosure of impregnating a porous article placed on a base plate and covered with a cylinder sealingly mounted on the base plate in the manner of a bell jar. Vacuum is applied to the upper part of the cylinder and impregnant is admitted through the base plate under the action of the vacuum. When the process is completed, the vacuum is broken, excess impregnant is removed from the cover, and the cover is removed from the base plate.

However, as previously mentioned, none of these prior patents discloses any techniques for precisely controlling the amount of coating slurries applied to the substrate to thereby improve the efficiency of the process and reduce the coating material loss.

SUMMARY OF THE INVENTION

The present invention meets these needs by providing a method and apparatus for vacuum coating ceramic substrate members with a slurry of refractory and/or catalyst metal components wherein precisely controlled, predetermined amounts of the slurry are metered for application to the ceramic monolithic substrate member. This eliminates the need for flooding the member with excess coating material and the previously necessary ancillary steps for removal of the excess coating material from the member. Thus, by using the process and apparatus of the present invention, it is possible to apply a uniform coating of the desired concentration of the refractory and catalyst metal components without the need for external coating removal or internal unplugging of the internal skeletal passageways of the ceramic monolithic substrate.

According to the present invention, a hollow substrate to be treated and having opposed open ends is transferred from a rest position such that one end is lowered into a dip pan into which has been introduced a predetermined amount or charge of slurry material containing the precious metal. With the one end fully immersed in the slurry, a vacuum placed on the other end of the substrate draws all of the slurry from the dip pan to coat the lower portion of the substrate. Thereafter the substrate is raised from the dip pan, then rotated, and again lowered so that the other end is fully immersed in another predetermined charge of the slurry and the process is repeated. Thereupon, the substrate is raised from the dip pan, rotated to return it to its original orientation, and returned to its starting location.

By the practice of the present invention, only the interior skeletal passageways of the monolithic substrate member are coated. No draining or purging of excess coating slurry from the substrate member is necessary nor is any pre-vacuum application step, such as pre-evacuation of air from a ceramic member, required. With the ceramic monolithic substrate member internally coated with a predetermined amount of the coating slurry, it may, thereafter, be passed to a drying and/or heat treating zone to effect high temperature curing of the coating. However, by reason of the limited amount of catalyst slurry utilized in the coating operation, an unplugging step is not a prerequisite to such heating step.

In a preferred embodiment of the invention, it has been found advantageous that after one end of the substrate member has been subjected to vacuum impregnation with a portion of the coating slurry, generally between 50 and 85 percent of the total predetermined amount of slurry, to invert the substrate member and continue the vacuum impregnation from the opposite end. This has been found to speed up the impregnation process and materially improve the uniformity of the coating distribution on the interior skeletal passageway walls.

The apparatus which serves to achieve the goals of the invention incorporates a number of unique features. One of these features is a control system comprised of a computer, sensors, and limit switches to assure that operations are performed on a timely basis and in a proper sequence.

Another feature of the invention resides in the utilization of the tank containing the slurry. It is preferably fabricated of stainless steel which is plastic or fiberglass lined or coated for ease of flow of the slurry, and has a bottom portion which slopes toward the outlet to assure continuing flow of all of the solid material present in the slurry. Its contents are regularly agitated and its temperature is maintained within acceptable limits.

Still another feature of the invention is the provision of a dip pan formed with a slurry receiving cavity preferably shaped to freely receive but closely conform to the shape, in cross section, of the substrate to be coated. Two different methods of introducing a predetermined charge of slurry into the dip pan are provided by the invention. In one instance, the magnitude of the predetermined charge is based on weight; in the other instance, it is based on volume.

A particularly critical part of the operation disclosed involves positioning each end of a substrate within the dip pan such that it is immersed in the slurry but spaced a specific distance from the bottom of a cavity formed in the dip pan. As the substrate is lowered toward the dip pan, appropriate sensors detect the end of the substrate which is about to be immersed in the slurry. The sensors signal the computer which, in turn, stops movement of the substrate when the end immersed in the slurry is spaced a proper distance above the bottom of the cavity in the dip pan.

Another feature of the invention resides in providing an appropriate mechanism for rotating the substrate after one end has been coated so as to orient the other end for the same coating procedure.

Still another feature of the invention resides in providing a vacuum cone which is lowered onto the exposed end of the substrate as the latter is being immersed into the slurry. Immediately prior to the vacuum cone initially engaging the end of the substrate, a low vacuum is applied, first to evacuate the interior of the substrate, then to begin drawing the slurry upwardly, after which high vacuum is applied to complete the coating task. The coating task is completed as to an end of the substrate when all of the slurry in the dip pan has been withdrawn. In this fashion, waste of costly slurry is avoided.

According to another feature of the invention, after the coating operations have been performed at both ends of the substrate, the substrate is rotated once again to return it to its original orientation. In this manner, the substrate will be properly returned to its original resting place or shelf without concern that it will strike the top of the shelf or drop down onto the shelf.

Other and further features of the invention will become apparent from the following description taken in conjunction with the following drawings. It is to be understood that both the foregoing general description and the following detailed description are exemplary and explanatory but are not restrictive of the invention. The accompanying drawings which are incorporated in and constitute a part of this invention, illustrate one embodiment of the invention, and together with the description, serve to explain the principles of the invention.

DETAILED DESCRIPTION OF THE DRAWINGS

In the drawings:

FIG. 9 is a top plan view of the slurry dip pan utilized with the production system of the present invention;

FIG. 10 is a cross section view taken generally along line 10—10 in FIG. 9;

DESCRIPTION OF THE PREFERRED EMBODIMENT

Figure 1:
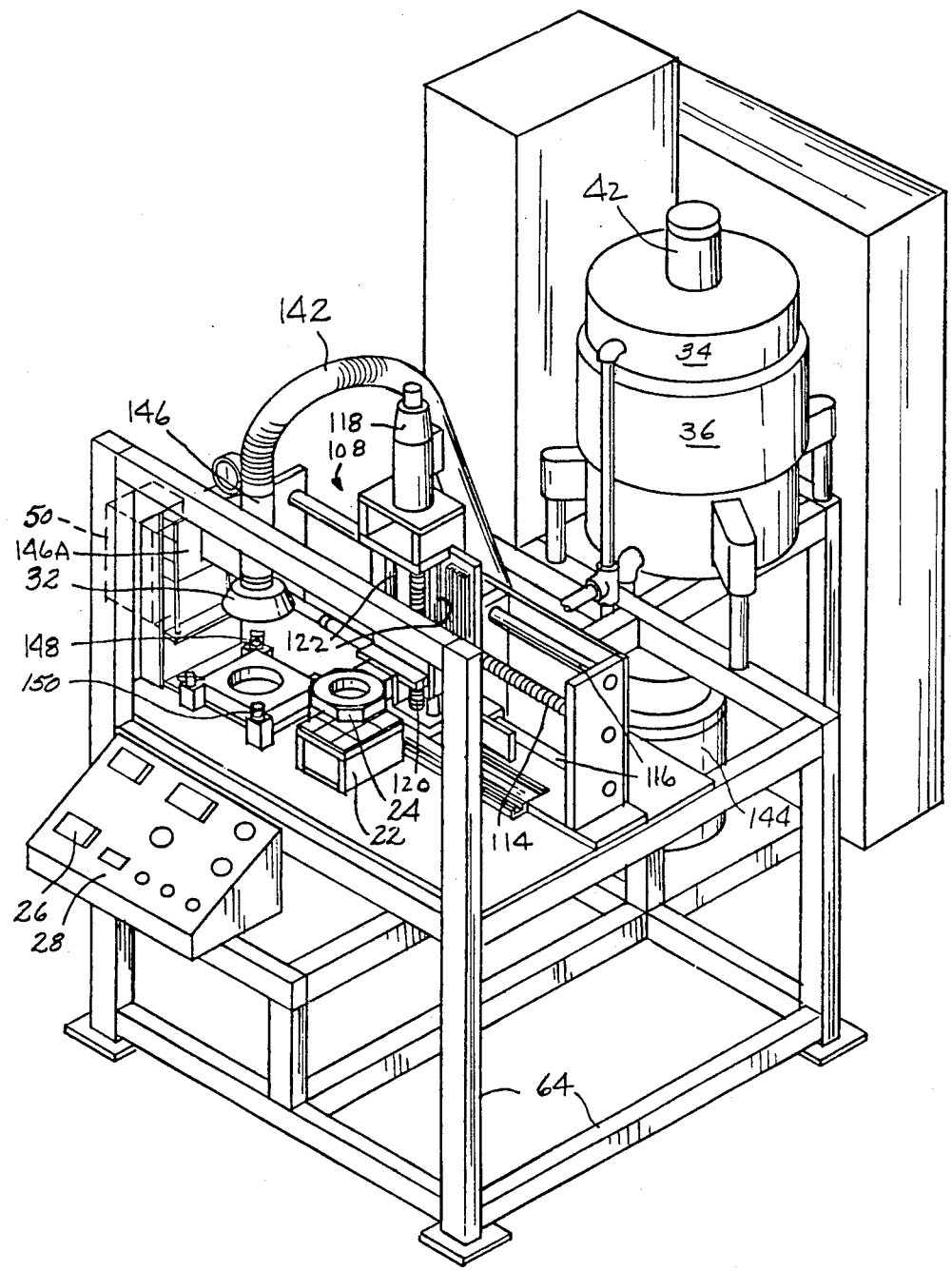
FIG. 1 is a perspective view of a production system embodying the principles of the present invention.
Figure 2:
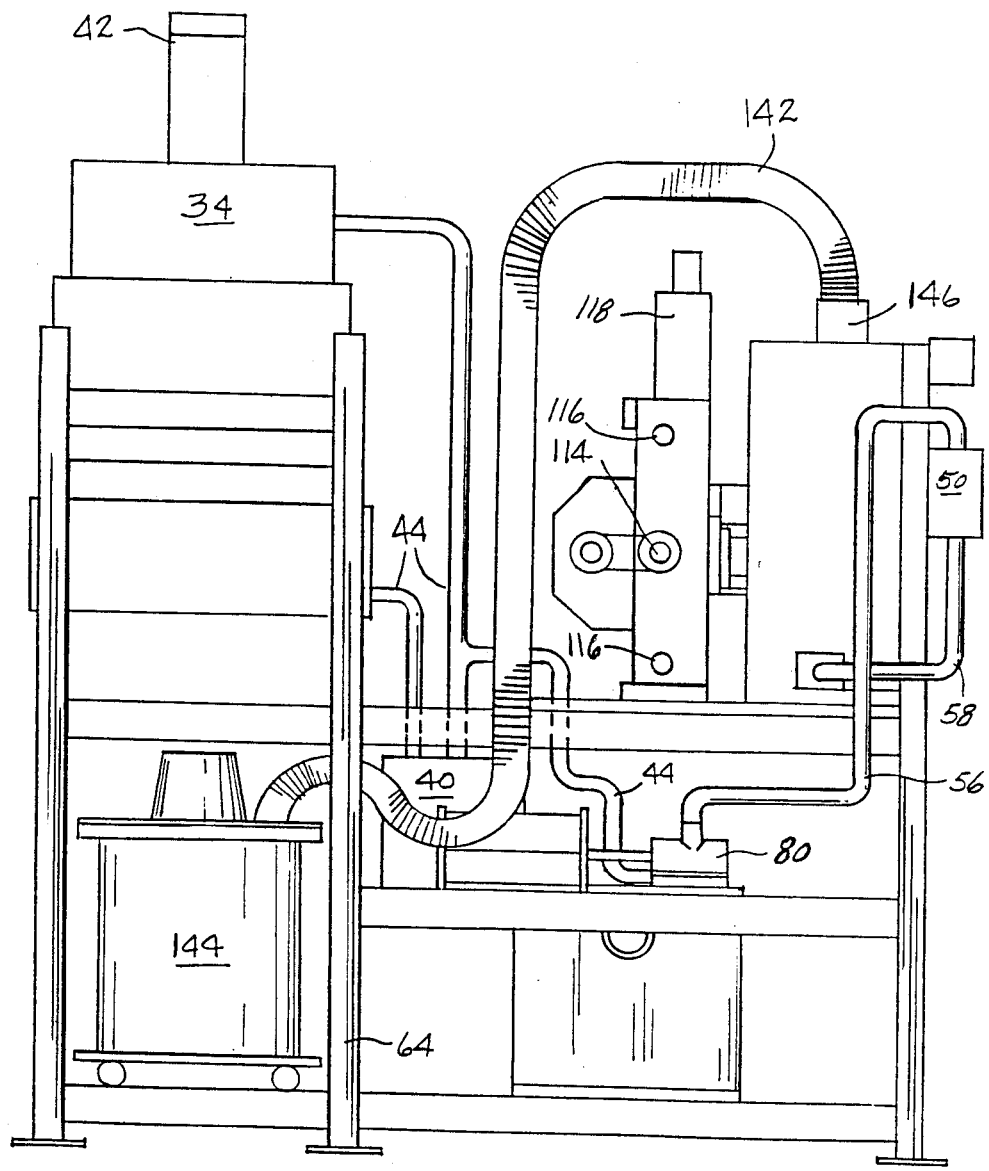
FIG. 2 is a side elevation view of one side of the system illustrated in FIG. 1.

Refer now to the drawings, and initially to FIG. 1 which generally illustrates a system 20 embodying the principles of the present invention. For purposes of introduction, it is desirable to explain that the overall process to be disclosed is a semiautomatic one in that the operator of the system must initially place the substrates to be coated into the system manually and remove them after they have been coated. Otherwise, the process requires no operator interaction.

An overview of the process steps carried out by the system are as follows. The operator places a substrate 21 (FIG. 13), which is hollow and open at both ends, on a shelf 22 within a substrate clamp 24, then pushes a start button 26 on a control panel 28. The substrate is secured by the clamp 24, transferred and lowered into a dip pan 30 which contains a charge of slurry material which is to be drawn up into the substrate. An initial low vacuum is imparted to the top of the substrate through a vacuum cone 32 and draws up the slurry in the dip pan to uniformly fill all cells after which a high vacuum is applied to coat the lower portion of the substrate. The substrate is then lifted out of the dip pan and rotated 180°. As this occurs, a second charge of slurry is placed into the dip pan. The substrate 21 is then lowered back into the dip pan and the sequenced vacuum reapplied to draw up the second charge of slurry into the opposite end of the substrate. The substrate is then lifted out of the dip pan, rotated back 180° to its original position and brought back to the shelf 22. The clamp then releases the coated substrate and the operator removes it from the system by hand.

Figures 6, 8:
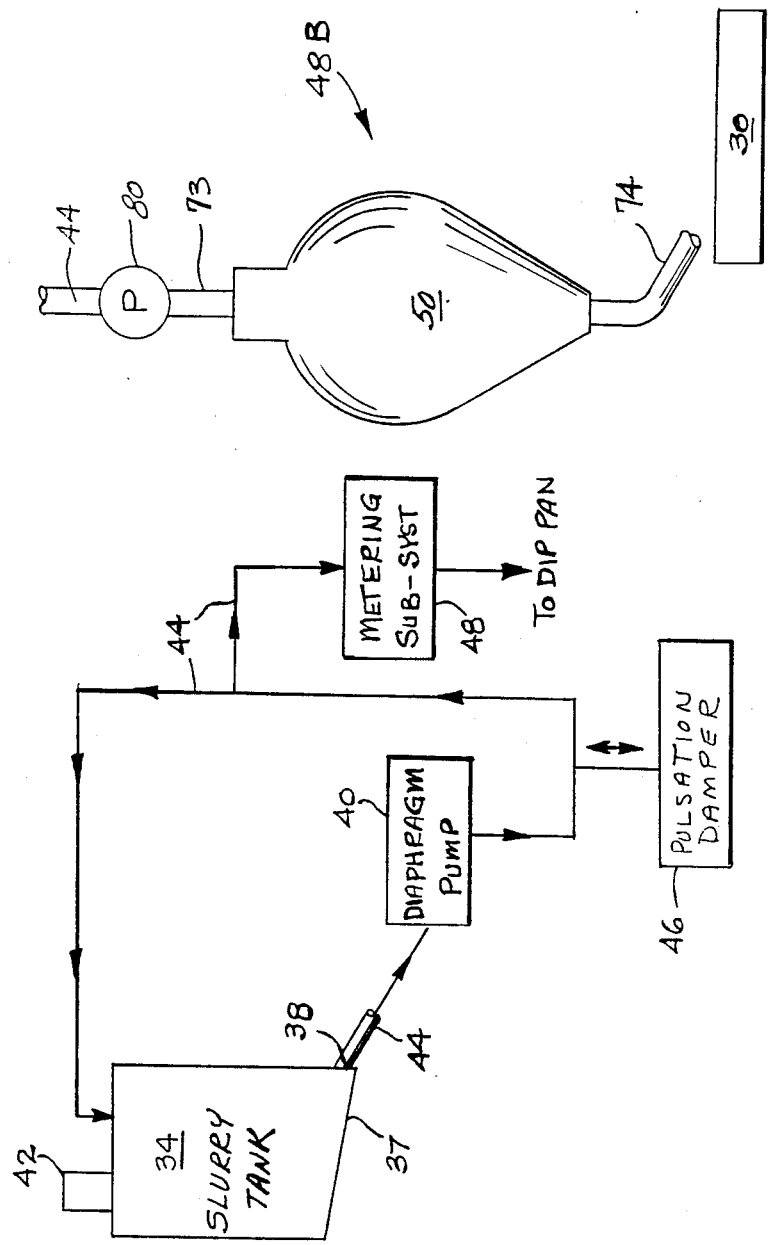
FIG. 6 is a schematic flow diagram of the slurry tank and circulation subsystem of the present invention.
FIGS. 7 and 8 are detail side elevation views, with certain parts shown schematically, illustrating different embodiments of the slurry metering subsystem.

While the overall system is generally illustrated in FIG. 1, it can be better understood by referring to a number of subsystems and the figures which best depict each of them. Thus, the primary subsystems and the figures which best depict them are generally as follows: slurry tank and circulation subsystem: FIG. 6; slurry metering subsystem: FIGS. 7–10; vacuum subsystem: FIGS. 1–5, and 11; mechanical handling subsystem: FIGS. 1–5, 13 and 14; and control subsystem: FIGS. 1–5, 12 and 14.

Turn now to FIG. 6 which is a schematic representation of a slurry tank 34 and its associated circulation subsystem 35 which is utilized by the system 20. The tank may be of any suitable size or construction, but it is preferably fabricated as a plastic or fiberglass lined or coated stainless steel container and formed with a jacket 36 for cooling water or other suitable fluid to maintain the slurry at a controlled temperature. A typical size of the slurry tank which has been utilized has a capacity of approximately 48 gallons of the slurry. The tank is preferably formed with a bottom 37 having a moderately angled slope, 5°, for example, in the direction of an outlet 38. The slope on the tank bottom 36 is intended to direct the solids in the slurry, if they are not fully dispersed, toward that side of the tank bottom which is nearest the outlet 38. This insures that a slurry rich in solids is brought to a recirculating diaphragm pump 40 which serves to cause flow of the slurry throughout the subsystem and, eventually, to the dip pan 30. One example of a diaphragm pump 40 which performs adequately in the subsystem is a Sandpiper unit, model number SB1-A type SN-1-A. Additionally, the slurry tank 34 may be provided with an agitator 42 as further insurance in maintaining the uniform suspension of the solids within the slurry.

Piping 44 for the subsystem can be of any suitable non-wetting material such as polyvinyl chloride (PVC) plastic pipe. In actual practice, pipe which has been found to be suitable is sold under the trademark "TYGON" and is disbributed by Fisher Scientific Corporation. The non-wetting feature of the pipe assures that the system will not become clogged with resultant loss of costly slurry material.

A pulsation damper 46 operates in a conventional manner in the subsystem to accommodate surges and provide uniform pressure throughout and thereby assure a constant rate of feed of slurry for the coating operation. An example of a damper which has satisfactory characteristics for the subsystem is one marketed under the trademark "Sandpiper", model TA-1-N-1-A, manufactured by Allen Pump Company of Cleveland, Ohio. For optimum effectiveness of the subsystem, it is desirable to place a high head, preferably on the order of 2 feet (0.60 meters) on the circulation lines or piping 44 between the diaphragm pump 40 and the slurry tank 34. In this manner, the circulation lines or piping remain filled with slurry to prevent the drawing of air in the system which undesirably causes the formation of foam.

Figure 7:
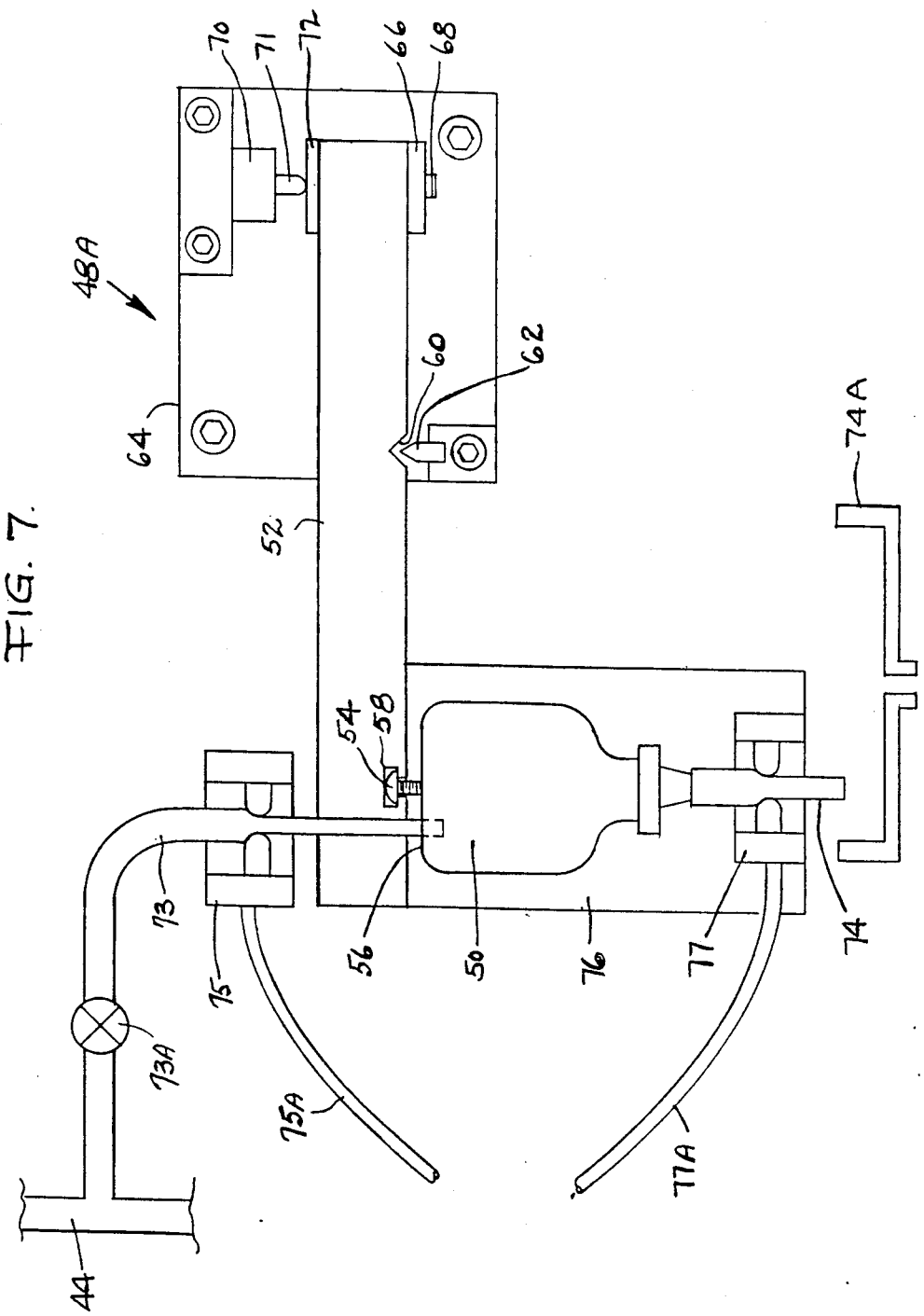

The slurry metering subsystem which is supplied by the slurry tank 34 and its associated circulation subsystem is indicated generally at 48 in FIG. 6. It serves to assure that proper control is maintained over the amount of slurry placed in the dip pan 30. One example of a suitable metering subsystem is illustrated in FIG. 7 and referred to by reference numeral 48A. This can be termed a weight subsystem, that is, one which measures an appropriate weight for a charge to be introduced into the dip pan 30. As illustrated, the subsystem 48A includes an inverted bottle or bladder 50 which is suitably suspended from one end of a balance arm 52. Specifically, a screw 54 of nylon or other suitable material is threadedly engaged with the center of the bladder's top 56. A head of the screw 54 is slidably but snugly received in a suitable recess 58 provided in the underside of the balance arm and near its end. Of course, it will be appreciated that the screw 54 may be replaced by some other suitable fastener having a shank portion in some fashion engaged with the bladder and an enlarged head spaced from the bladder. Indeed, the bladder may even be molded to provide a similarly shaped but integral hanging device. In turn, the balance arm is notched in a central region of its underside, as at 60, to receive a hardened knife edge 62 which is fixed on the structural framework 64 for the system 20. Thus, the bladder 50 is mounted from a location which is in line with its center of gravity and in a fashion which readily permits its insertion and removal, a distinct benefit for purposes of cleaning and replacement.

At the opposite end of the balance arm 20, a counterweight 66 is threadedly received on a stud 68 and serves to substantially balance the balance arm assembly about the knife edge 62 so as to initially null a load cell 70 whose operative finger 71 is sensitive to movement of the balance arm. The load cell 70 may have a digital readout (not shown), one example being that marketed under the trademark "Sensotec", Model 450D, Hi/Low Option, manufactured by Sensotec Corporation of Columbus, Ohio. A vibration dampener pad 72, preferably composed of a high density rubber or other suitable resilient material is applied to the balance arm so as to cushion the interface between the balance arm and the finger 71. In this context, it is also noteworthy that the distance along the balance arm between the knife edge 62 and the recess 58 from which the bladder 50 is suspended (representing the center of gravity of the bladder), is preferably much greater than the distance between the knife edge and the point of contact of the finger 71 with the pad 72. This serves to provide a mechanical amplification of the weight of the slurry to minimize the contribution of electrical noise created by the load cell 70.

The subsystem 48A also includes an intake line 73 which extends from the piping 44 in the circulation subsystem and loosely through a hole in the top 56 of the bladder 50. An isolation valve 73A positioned in the intake line 73 can be operated as needed to allow work to be performed on the subsystem 48A. Similarly, an outlet line 74 is connected to, and extends from the bottom of the bladder 50 and serves to direct flow of the slurry by way of gravity feed to the dip pan 30 via a surge accumulator 74A. The lines 73 and 74 are preferably composed of rubber tubing or other suitable flexible conduit material. A first normally closed feed valve 75, which is suitably mounted on the framework 64, and which may be a pinch valve operated by compressed air from an air line 75A as illustrated in FIG. 7 or any other suitable type of valve, operates on the line 73 to regulate flow of slurry into the bladder 50. In a similar fashion, a second normally closed feed valve 77 is mounted on a bracket 76 which is bolted or otherwise suitably attached to the balance arm adjacent its first end and extends downwardly therefrom. As with feed valve 75, the valve 77 may be a pinch valve operated by compressed air from an air line 77A. The valve 77 serves to regulate the flow of slurry in the line 74 out of the bladder 50 and toward the dip pan 30. Another benefit of the high head between the slurry tank 34 and the diaphragm pump 40, as mentioned above, is to assure that the bladder 50 be filled in a minimum of time so as to achieve a minimum of total cycle time.

Since the upper feed valve 75 is fixed to the framework 64, the intake line 73 must have sufficient length and extend a sufficient distance into the bladder 50 to accommodate movement of the bladder as the balance arm 52 swings on the knife edge 62. Unlike the intake line 73, the outlet line 74 moves in a unitary fashion with the bladder 50 and the lower feed valve 77. The outlet line 74 discharges the slurry into the surge accumulator 74A positioned between the bladder and the dip pan 30. The surge accumulator 77A enables the bladder 50 to be refilled while flow of the slurry continues into the dip pan.

Figure 15:
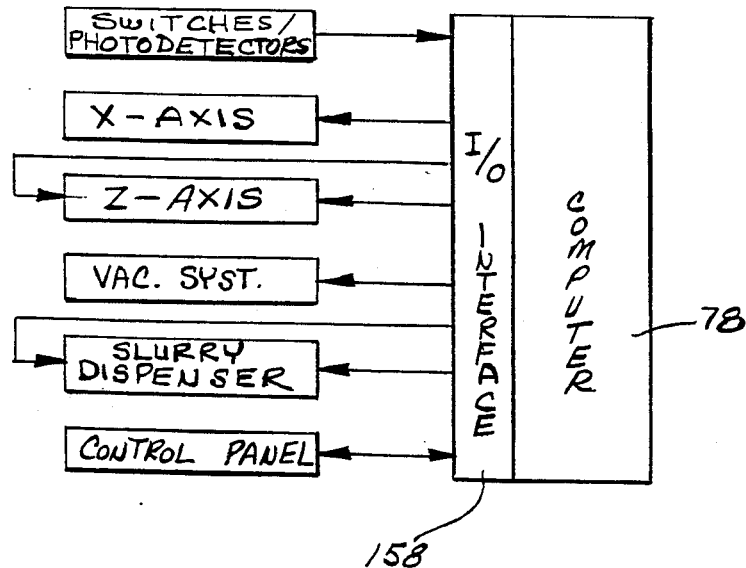
FIG. 15 is a schematic representation of the control subsystem which operates the production system embodying the principles of the present invention.

With continued reference to FIG. 7, a constant head of approximately 2 feet of the slurry is preferably maintained on the upper or first feed valve 75. When it is desired to fill the bladder 50 with slurry, the load cell 70 is nulled by reason of the counterweight 66. Thereupon, a digital signal from a computer 78 (FIG. 15) directs the upper feed valve 75 to open to start the operation of filling the bladder 50. As the slurry is received in the bladder, the finger 71 of the load cell 70 is moved upwardly (FIG. 7) in accordance with counterclockwise movement of the balance arm 52 and causes a signal to be transmitted to the computer 78 to operate the feed valve 75 to close and thereby terminate the filling procedure. Subsequently, at such time that it is desired to release the contents of the bladder 50 into the dip pan 30, the feed valve 77 is operated, upon command, for that purpose.

The surge accumulator 74A enables the bladder 50 to be refilled while flow of the slurry continues into the dip pan. It will also be appreciated that the construction just described provides a weighing system which has a minimum of drag as it moves and therefore assures a high degree of accuracy. The construction also assures a rapid rate of response due to integration of digital (computer 78) and analog (load cell 70) devices. That is, the upper feed valve 75 is closed by signal from the load cell 70, then held closed by the computer 78 until the computer commands it to be again opened. Thus, scan time errors inherent in a digital system are eliminated by analog monitoring.

Another embodiment of a slurry metering subsystem is indicated by reference numeral 48B and illustrated in FIG. 8. For purposes of this emodiment, a metering pump 80 is employed. It may be, for example, a pump such as model number NP-31 manufactured and marketed by Bran and Lubbe of Wheeling, Ill. The bladder 50 may be the same as previously described with respect to subsystem 48A. As illustrated in FIG. 8, a head of slurry is provided by piping 44 to the inlet of the metering pump 80. The outlet of the pump connects by way of an intake line 73 into the bladder 50, the line 73 being of a type similar to that used in the embodiment of FIG. 7. The outlet line 74, also generally as previously described, suitably connects the bladder 50 with the dip pan 30. The bladder may be utilized to avoid splashing since the metering pump, by its nature, delivers slurry in spurts. However, it should be understood that it is not necessary to utilize the bladder 50 in the system in which event the metering pump would provide flow of the slurry directly into the dip pan. The particular type of metering pump referred to above is preferably provided with a mechanical control to manually determine, in a known fashion, the length of stroke of the pump. By so controlling the stroke, the amount of charge placed into the dip pan 30 can be controlled as previously noted. The system illustrated in FIG. 8 thus is based on volume control of the charge in contrast to the weight control utilized in the embodiment of FIG. 7.

Turn now to FIGS. 9 and 10 which illustrate the dip pan 30, that container which receives the charge of slurry before it is drawn up into the substrate 21. The dip pan may be fabricated in any appropriate fashion and out of any suitable material. One such suitable material which has been employed is a plastic material manufactured by General Electric Company and sold under the trademark "Delrin", the generic name being "acetal". The dip pan comprises a main body 82 in which is formed a cavity 84 for receiving an end of the substrate. Also, a plurality of suitable holes 86 are formed for releasably mounting it on a base 87 which, in turn, is fixed on the structural framework 64 of the system 20. In this manner, one main body 82 can be substituted for another according to the size of the cavity 84 in order to accommodate various sizes and contours of substrates.

It is preferred that the dip pan 30 be fabricated of a non-wettable material, of which, Delrin is an example. As with the piping 44, use of such material serves to avoid adherence of the costly slurry material after the draw up operation has been completed. Although Delrin has been mentioned as one suitable material, in actuality, any relatively non-wettable material with good dimensional stability can be used. Other such materials might be from the families of polystyrene and polypropylene. However, while a non-wettable material is preferred, if a material chosen is slightly wetting, the first charge of slurry will serve to completely wet the cavity 84 and, once wetted, the entire amount of subsequent charges of slurry into the dip pan will be received on the substrate.

Since substrates are generally produced with an oval cross section, the cavity 84 of the dip pan is preferably of a similar shape for convenience as well as for conservation of the slurry. With particular reference to FIG. 10, the cavity 84 of the dip pan 30 is illustrated as having a clearance around the outer periphery of the substrate such that the substrate can be easily received within the cavity. Nevertheless, the position of the substrate is not critical and the process can be properly performed even if the substrate is closer to one side of the cavity than to the other. In practice, however, it has been found desirable to hold the end of the substrate 21 at a nominal distance of 0.040 inches (approx. 1.0 mm) above the bottom of the cavity 84 (see FIG. 11). This ensures that, with a charge of the proper magnitude, the substrate periphery will be immersed to a maximum of about 0.25 inch (approx. 6.4 mm) in the slurry once the substrate has reached its draw up position. The gap between the end of the substrate and the bottom of a cavity in the dip pan has a tolerance of plus or minus 0.010 inches (approx. 0.25 mm) which is to say that the range of a preferred distance of the end of the substrate above the bottom of dip pan is between 0.030 inches (approx. 0.75 mm) and 0.050 inches (approx. 1.25 mm). As long as this gap tolerance is maintained, the end of the substrate need not be parallel with the bottom of the cavity of the pan.

Although noted above, it is preferred to have the periphery of the substrate immersed in the slurry to a depth of approximately 0.25 inch (approx. 6.4 mm). However, it is only necessary to have some slight amount of the periphery of the substrate covered by the slurry at the beginning of the draw up process. Of course, it will be appreciated that if the end of the substrate were not immersed in the slurry, and there was no contact between the slurry and the peripheral edge of the substrate, the process would not work because air around the lower end of the substrate rather than the slurry would be drawn up into the substrate. However, with just a small portion of the end of the substrate immersed in the slurry, the high vacuum will assure that the slurry will continue to be drawn up into the substrate until no slurry remains in the cavity 84.

As particularly well seen in FIG. 10, a slurry inlet passageway 88 is formed in the main body 82 to receive an end of the outlet line 74 which communicates through a connecting aperture 90 with cavity 84. The passageway 88 and its associated connecting aperture 90 are illustrated as being angled approximately 15° with respect to the bottom of the cavity 84. However, the magnitude of this angle is not a critical value but need only be sufficiently large to assure the flow of slurry into the bottom of the cavity. Furthermore, the aperture 90 is flared so as to prevent splashing of the slurry as it flows into the cavity 84.

Figure 14:
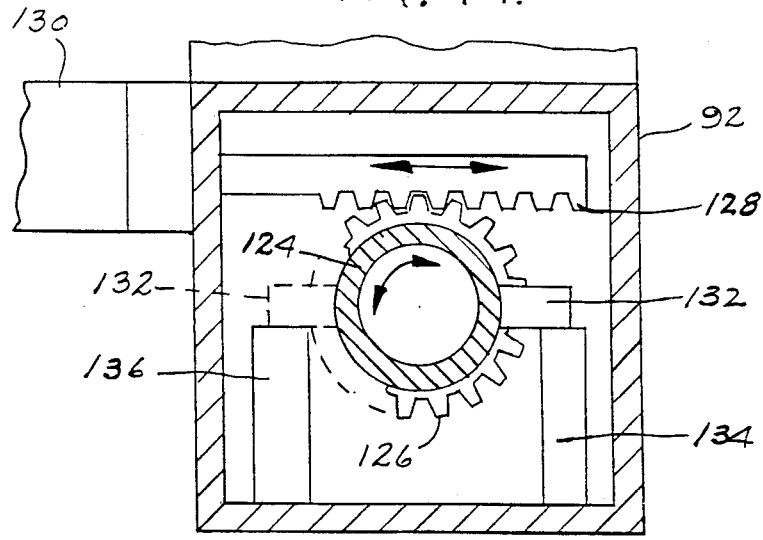
FIG. 14 is a cross-section view taken generally along line 14—14 of FIG. 13.

Turn now to FIG. 14 which illustrates in detail a rotary index arm 92 and the substrate clamp 24 rotatably mounted at an end of the arm 92. The clamp 24 is generally disc-shaped and is formed with a centrally located opening 96 which extends totally through the clamp from its first, now bottom, side 98 through to its second, now top side 100. The substrate is shown in phantom extending through the opening 96 and being held by the clamp over the dip pan 30. The clamp 24 holds the substrate by means of an inflatable gasket 102 which is suitably attached thereto within the opening 96 and attached to the clamp 24 for movement between a deflated condition withdrawn from the substrate at an inflated state engaging and holding the substrate midway its ends.

A pressurized air line 104 is suitably connected to a source of high pressure air and, by means of a fitting 106, serves to introduce pressurized air through the body of the clamp 24 into the gasket 102. When the system is initially activated, air is fed to the inflatable gasket through the air line 104 to inflate it and securely hold the substrate while it is being processed. At such time that the substrate has completed its processing and is being returned to its original position, the air is released from the gasket and it is deflated. An operator then merely slips the coated substrate out of the clamp and replaces it with a new substrate to be coated.

Refer once again to FIGS. 1, 3, and 5 in which it is shown that the substrate calmp 24 is mounted on a pair of carriages 108 and 110 for movement, respectively, along the horizontal or X axis and along the vertical or Z axis. A servo motor 112 appropriately rotates a lead screw 114 to drive the carriage 110 backwards and forwards along the horizontal axis. Cooperating with the lead screw 114 are a pair of Thompson rods 116 which are spaced apart and parallel to the lead screw 114 and attached at their ends to the structural framework 64. The Thompson rods 116 are slidingly received on the carriage 108 to maintain its orientation relative to the framework as it is moved to and fro.

In a similar fashion, a servo motor 118 operates a lead screw 120 which is threadedly engaged with the carriage 110 to move it up and down. Similar in construction to that of the horizontal carriage 108, Thompson rods 122 are mounted at their ends to the horizontal carriage 108 and are parallel to the lead screw 120 and slidingly received on the vertical carriage 110 to assure its orientation as it moves upwardly and downwardly.

It will be appreciated that the horizontal carriage 108 moves the clamp 24 from the region of the shelf 22 over to the region of the dip pan 30 and back again. Similarly, the vertical carriage 110 operates to move the clamp up and down both above the shelf 22 and above the dip pan.

When the first end of the substrate has been processed in the dip pan, it is raised by means of the servo motor 118 and lead screw 120 to an appropriate position so that the substrate is completely clear of the dip pan. The substrate is then rotated on the clamp 24 to bring its other end into position to be lowered into the dip pan. The mechanism which performs this rotation is most clearly illustrated in FIGS. 13 and 14.

It was previously mentioned that the clamp 24 is rotatably mounted in a suitable manner on the rotary index arm 92. The index arm 92 is, in turn, integral with the vertical carriage 110. A cylindrical extension 124 of the clamp 24, that portion of the clamp which is rotatably mounted on the index arm 92, has a segment gear 126 fixed at its end distant from the region of the opening 96 in the clamp 24. A rack 128 which is slidably mounted on the index arm 92 engages the gear 126 and is operable by a pneumatic actuator 130 to move upwardly and downwardly, and by so doing, to rotate the clamp 24 so as to reverse the positions of the bottom side 98 and top side 100.

A lug 132 is fixed to the outer wall of the cylindrical extension 124 and extends radially outwardly therefrom and serves as part of a mechanism for stopping rotation of the clamp 24 and holding it fixed at the positions desired. Specifically, as illustrated in both FIGS. 13 and 14, the lug 132 is selectably held in engagement with a stop member 134 which is rigidly mounted on the index arm 92. In this situation, the clamp 24 lies in a substantially horizontal plane with the first side 98 being a bottom side and the second side 100 being a top side. However, the actuator 130 can be operated to rotate the extension 124, and with it the lug 132, until the lug engages another stop member 136 also fixed to the index arm 92 but at a diametrically opposed location relative to the extension 124.

To illustrate this range of movements, the lug 132 is illustrated in dotted lines in FIG. 14. When the lug 132 engages the stop member 136, the clamp 24 will have been rotated to a position such that the first side 98 becomes the top side, and the second side 100 becomes the bottom side. In this manner, operation of the gear 126 and rack 128 causing the lug 132 to first engage one stop member 134 and then the other stop member 136 serves to rotate the extension 124 through an arc of 180°. Thus, when a substrate 21 is supported by the clamp 24, in one position of the clamp, one end of the substrate is oriented for reception within the cavity 84; and when the clamp is rotated 180° and held as just described, the opposite end of the substrate is then oriented for reception within the cavity.

Figure 11:
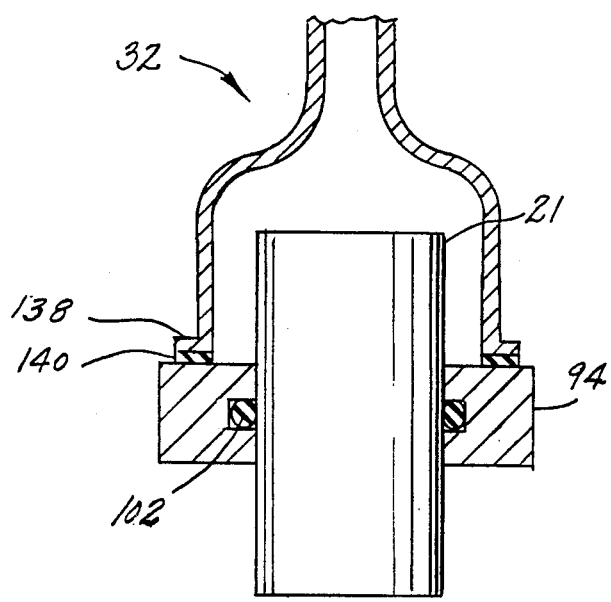
FIG. 11 is a detail side elevation view, certain parts being cut away and in section, illustrating a vacuum cone in an operative relationship with respect to a substrate which is in the process of being coated.
Figure 12:
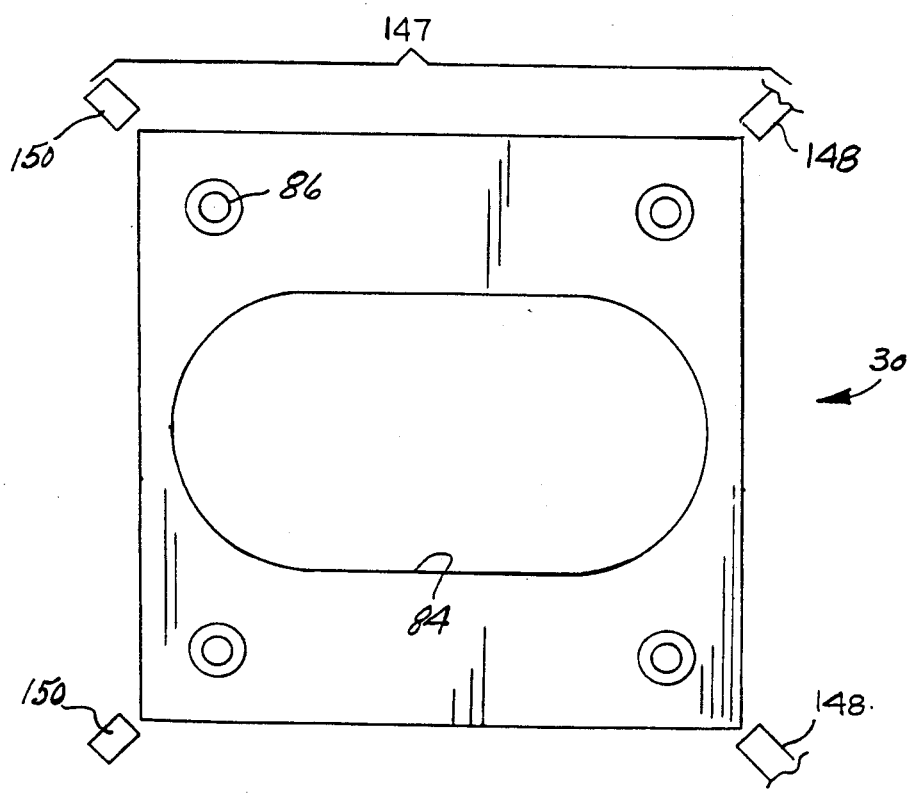
FIG. 12 is a detail top plan view of the dip pan FIGS. 9 and 10 illustrating the sensor devices associated therewith.

It was previously mentioned that the vacuum cone 32 serves to engage the end of the substrate 21 and by applying a vacuum draws the slurry up into the substrate from the dip pan. Reference now to FIG. 11 will aid in further understanding the construction of the vacuum cone. It is seen that a lower rim 138 of the vacuum cone 32 suitably mounts a seal gasket 140 which sealingly engages a side of the clamp 24 in such a fashion as to essentially prevent the lose of vacuum when the cone and clamp are engaged. From FIG. 11 it is seen that when a substrate is placed into the clamp 24, it is substantially centered along its longitudinal axis. It is also noteworthy that while the system can utilize different sizes of clamps 24 and dip pans with different sizes of cavities 84, all to accommodate different sizes of substrates, the vacuum cone 32 is so configured by reason of its bell shape to generally accommodate all sizes of substrates.

With particular reference to FIG. 1, it is seen that the vacuum cone 32 is connected via a line 142 to a source of vacuum. A preferred arrangement for the source of vacuum is a vacuum pump 144 driven by a variable speed motor. At a low motor speed, low vacuum is generated in the range of 1½ to 2 inches (approx. 38 to 50 mm) of water at 0 cfm; and at a high motor speed, high vacuum is generated in the range of 6 to 7 inches (approx. 150 to 175 mm) of water at 200 cfm.

Figure 3:
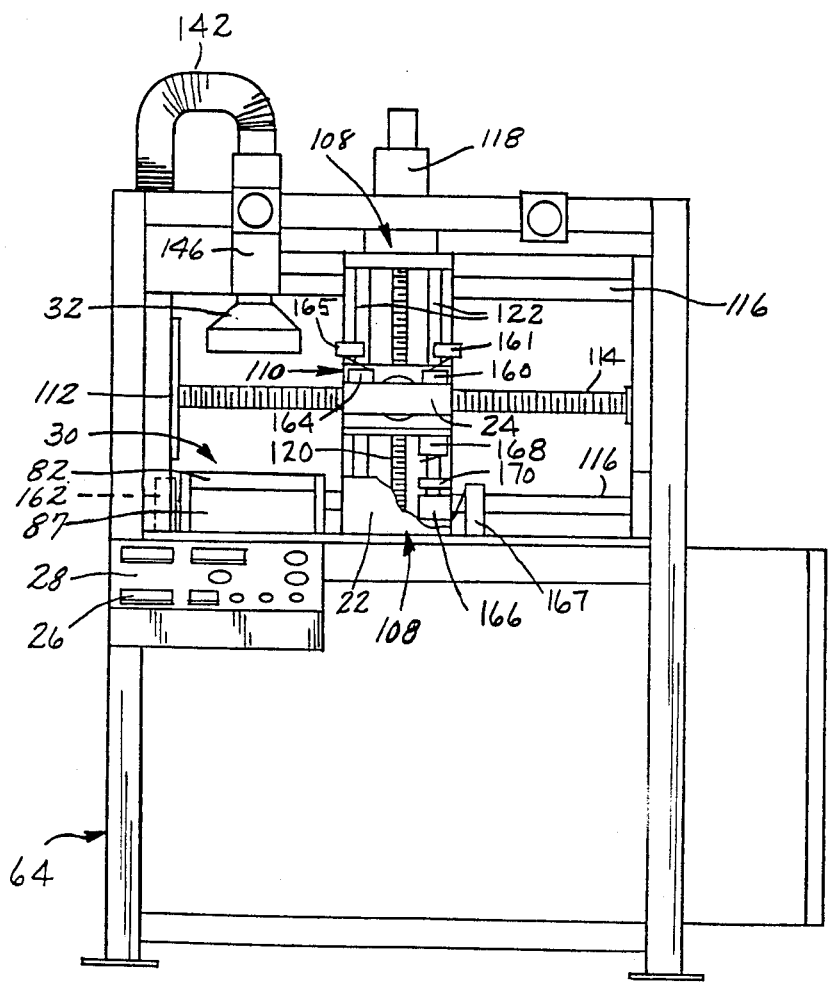
FIG. 3 is a front elevation view of the system illustrated in FIG. 1, a part being cut away for improved visability.
Figure 4:
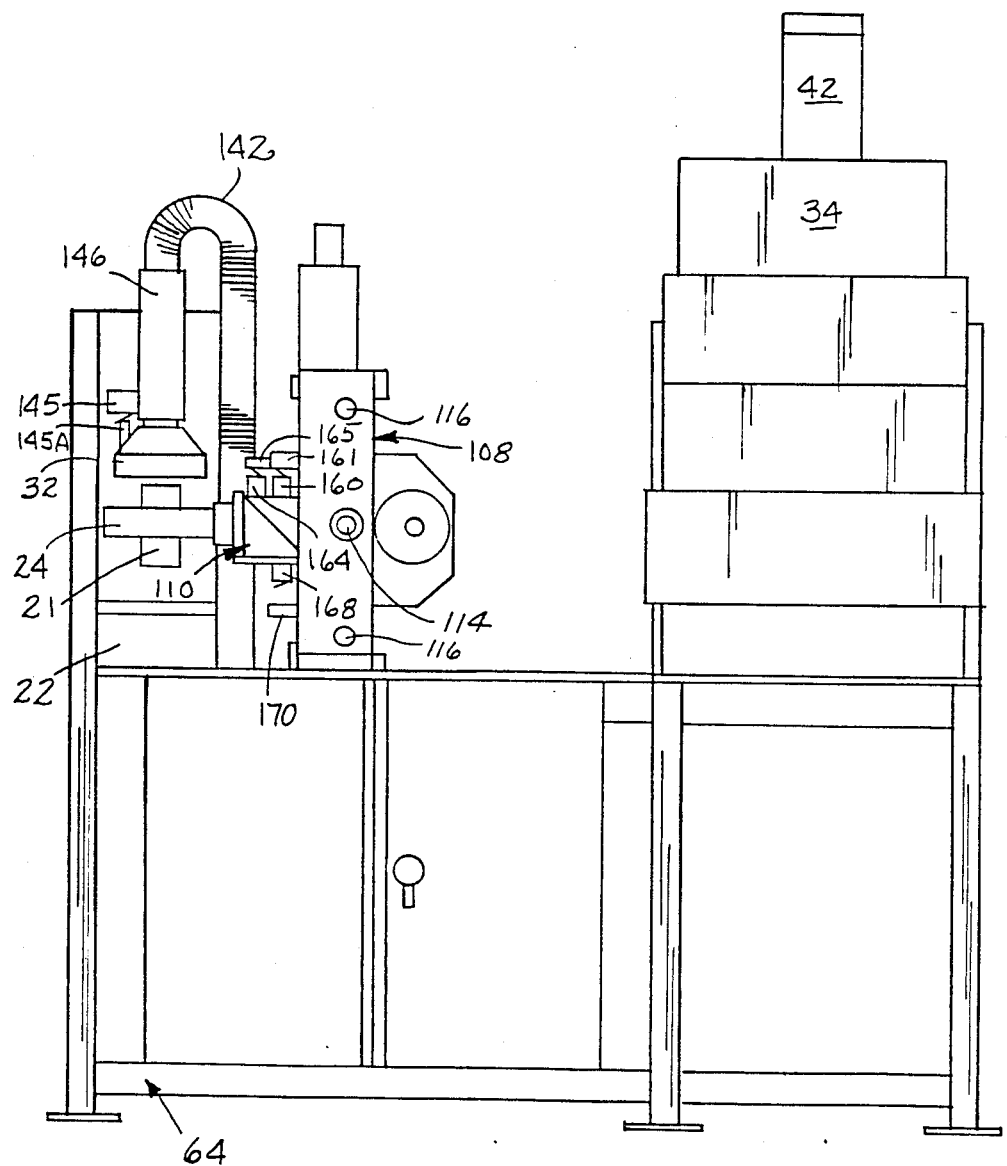
FIG. 4 is a side elevation view of the production system taken from the side opposite that illustrated in FIG. 2.
Figure 5:
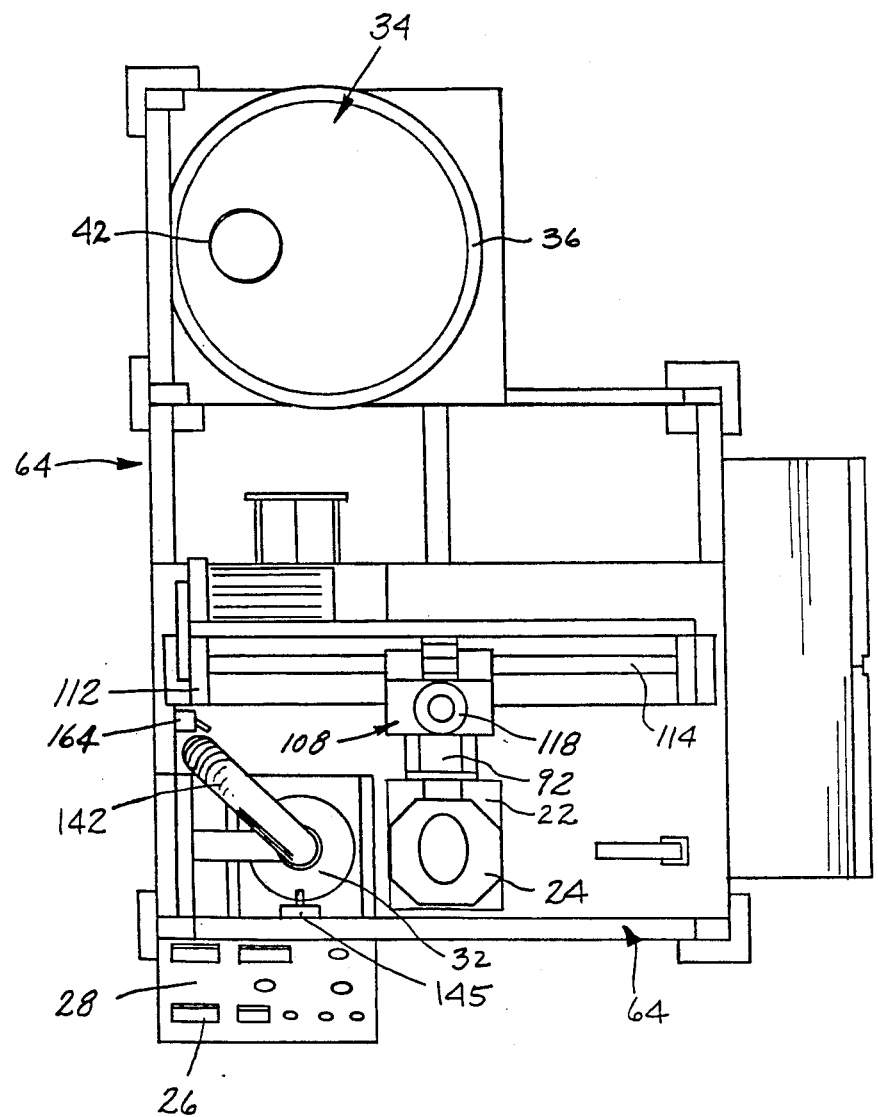
FIG. 5 is a top plan view of the production system illustrated in FIGS. 1-4.

As particularly well seen in FIGS. 1, 3, and 4, the vacuum cone 32 is positioned above the dip pan 30, approximately supported on the structural framework 64, and accurately aligned with the cavity 84. By means of a suitable air cylinder 146, the vacuum cone can be moved along guides 146A between a raised or inactive position and a lowered or active position for engagement with the upper end of the substrate 21. Its raised position is defined when a cam 145A which is integral with and protrudes from the vacuum cone 32 strikes a limit switch 145 mounted on the exterior of the air cylinder 146 (FIG. 4). Operation of the switch 145 deactivates the air cylinder 146 while the computer 78 serves to deactivate the air cylinder when the vacuum cone reaches its lowered position engaging the substrate. The downward movement of the vacuum cone is effected by the air cylinder 146 in a coordinated fashion with movement of the clamp 24 as it carries a substrate toward the dip pan. That is, the vacuum cone 32 is moved downwardly simultaneously with the substrate carrying clamp and engages the upper end of the substrate at substantially the same time, or slightly before, that the substrate enters the slurry in the dip pan.

Figure 13:
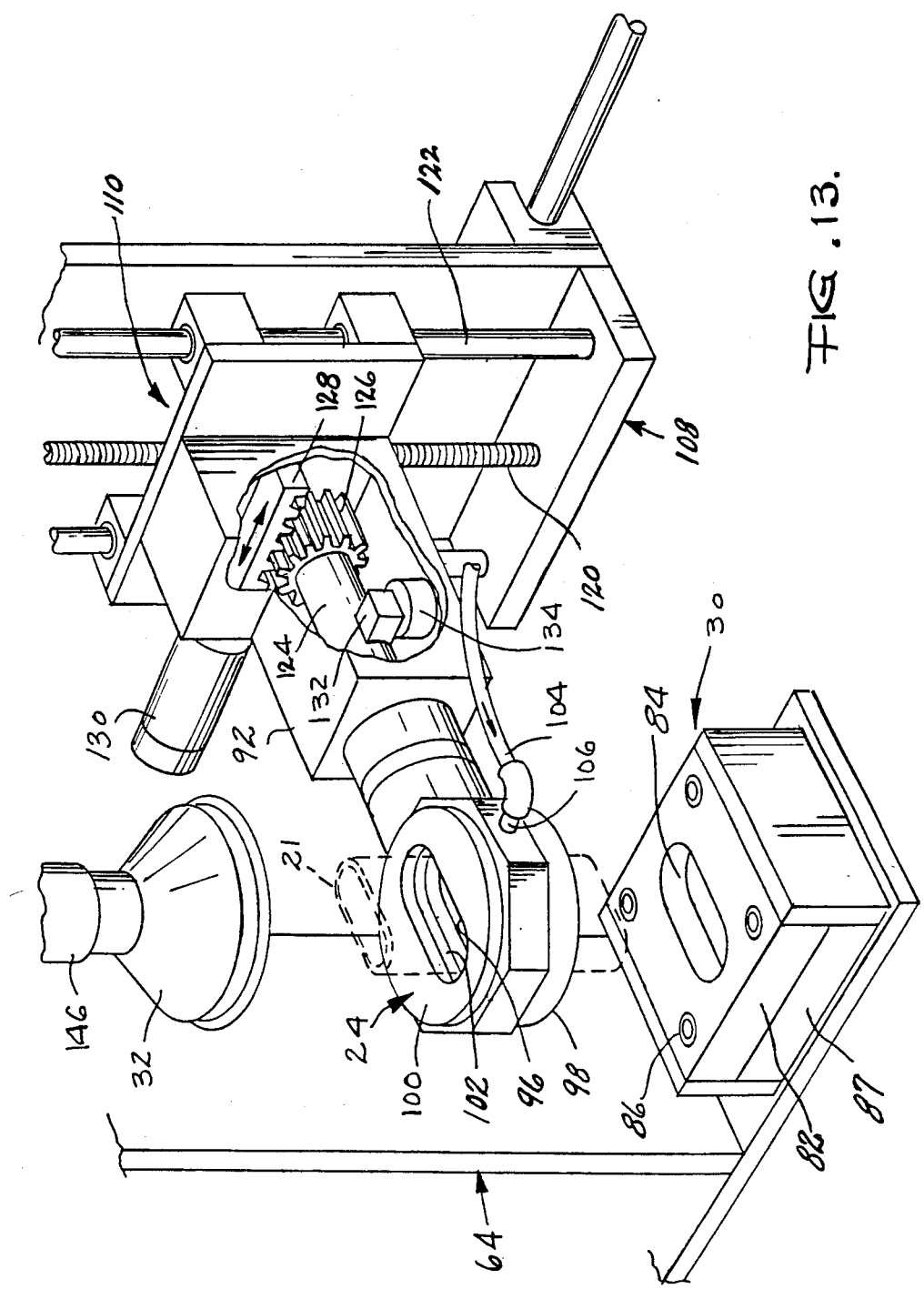
FIG. 13 is a perspective view illustrating the substrate clamp and the rotary index arm for rotating the substrate through an arc of 180°.

Turn now to FIG. 13 which generally illustrates an infrared sensor arrangement for controlling the height of the substrate 21 as it is placed into the dip pan with its lower end immersed in the slurry. The sensor arrangement incorporates a pair of sensor systems 147 each acting diagonally across the pan 30 and therefore across the path of movement of the substrate. Each sensor system contains a signal emitting source 148 and an associated detector 150, either a detector or a source being located in each corner of the pan. The sensor systems are commercially available units, one example being that sold under the trademark "Infra-Red Thru-Beam Switch" and manufactured by Balluff, Inc. of Florence, Ky.

The purpose of the sensor systems is to determine when the lower end of the substrate approaches the pan and the charge held therein. Another purpose of the sensors and the reason for having two pairs of them, is to determine whether or not the substrate held in the clamp 24 is in a skewed position such that the end of the substrate would not properly enter the cavity 84. If such a situation were detected, the coating operation with respect to that substrate would be aborted and that particular substrate would be returned to the shelf 22 for repositioning by the operator. As the substrate approaches the dip pan upon downward movement of the clamp on the vertical carriage 110, its lower end activates the sensor system 147. At this point, the computer 78 (FIG. 15) takes over control of the further movement of the clamp to assure that the end of the substrate is held at the proper distance from the bottom of the dip pan and to regulate the point in which the high vacuum is placed on the substrate for the draw up operation.

It will be appreciated that one sensor system 147 is adequate to determine whether a substrate is present and moving toward the dip pan. That is, as the substrate descends, it interrupts a signal emitted from the source 148 so that it is not received by the associated detector 150. However, two cooperating sensor systems are necessary to determine whether the substrate is properly oriented. Specifically, the two systems are so positioned (FIG. 12) such that the signals emitted and received by each detector are transverse to one another as well as to the path of travel of the substrate. In this manner, if the signals from both sources 148 to their associated detectors 150 are interrupted simultaneously, the computer 78 would be so informed and that would indicate that the substrate is properly oriented. However, if the signals are interrupted sequentially, for example, with a time differential of 100 milliseconds or more, the computer would understand that to mean that the substrate is not properly oriented for reception in the cavity 84. In that event, the computer can initiate appropriate alarms, perhaps audible, perhaps visual such as a light on the control panel 28, and cause operation of the system 20 to cease until the problem is corrected. The two sensor system operates in a similar fashion in event a source 148 or a detector 150 is accidentally splashed and coated with slurry thereby preventing it from functioning.

The control subsystem for the system 20 generally comprises the start button 26 on the control panel 28 suitably mounted to the front of the framework 64, the computer 78 (FIG. 15), the sensor systems 147 (FIG. 12), and numerous limit switches including 145 and others to be presented in the course of describing the operation of the system 20, below. One example of the computer 78 may be Model 2/15 sold under the trademark "Mini-PLC" by Allen-Bradley Company of Highland Heights, Ohio, which in fact, acts as the central processing unit (CPU) or brain of the system 20. The computer 78 receives information from the limit switches, sensor systems 14, and load cell 70 regarding the various stages of operation of the system and provides suitable instructions via an I/O interface 158 for operation for each of the subsystems in a proper, sequential manner.

The structure of the system 20 having been disclosed, its operation will now be described.

At the outset, the operator manually loads the substrate to be coated into the substrate clamp 24 by placing its lower-most end on the shelf 22. The operator then pushes the start button 26 which simultaneously causes a number of operations to take place. A low vacuum is initially applied via line 142 to the vacuum cone 32. At the same time, the slurry metering subsystem 48 meters a charge of slurry into the dip pan 30. Additionally, the pneumatic actuator 130 is energized such that lug 132 is held firmly against stop member 134 thereby maintaining and firmly holding the substrate in its original orientation. Also, pressurized air is introduced via the air line 104 to inflate the gasket 102 by which the clamp 24 firmly holds and supports the substrate.

With these initial operations accomplished, the vertical carriage 11 is driven upwardly on the vertical lead screw 120 about 0.25 inches (6.4 mm) off the top of the shelf 22 to raise the bottom of the substrate sufficiently to provide clearance for its subsequent horizontal movement. When a limit switch 160 mounted on the carriage 110 engages a cam 161 mounted on the carriage 108 (FIG. 3), further movement in the vertical direction is halted but the horizontal lead screw 114 begins rotation to drive the horizontal carriage 108 horizontally to position it in alignment with the cavity 84 in the dip pan 30.

A limit switch 162, suitably mounted on the framework 64 (FIG. 3) is provided to position the substrate over the dip pan as it moves from its position over the shelf 22 to its position over the dip pan. The limit switch 162 is aligned with the horizontal carriage 108 such that the outer surface of the carriage engages the switch at the point of extreme movement for the carriage. Actuation of the limit switch 162 not only serves to terminate rotation of horizontal lead screw 114, but also to initiate rotation, once again, of the vertical lead screw 120 to move the vertical carriage 110 downwardly and with it, the clamp 24 supporting the substrate. Actuation of the limit switch 162 also initiates downward movement of the vacuum cone 32. The motor is activated by the computer 78 to generate the low vacuum as previously described when the vacuum cone begins to descend.

Movement of the vacuum cone and of the clamp supported substrate is coordinated such that when the lower end of the substrate enters the slurry in the dip pan, or slightly before, the vacuum cone sealingly envelopes the upper end of the substrate. This aids in evacuating the substrate before it reaches its terminal position.

As the lower end of the downwardly moving substrate passes through the plane of the sensor systems 147, and activates them, the further movement of the lower end of the substrate into the dip pan then becomes controlled by the computer 78 until brought to a position approximately 0.040 inches (approx. 1.0 mm) above the bottom of the cavity 84. At the same time, as just noted, the vacuum cone descends until it sealingly envelopes the upper end of the substrate. As the substrate is being immersed into the slurry, the low vacuum being applied to the vacuum cone 32 serves to draw the slurry up into the interior of the substrate. This process of drawing the slurry up into the interior of the substrate is sometimes referred to as "loading" of the slurry. Approximately 1½ to 2 seconds after the substrate reaches its bottom or terminal position, which is approximately ½ second after the substrate enters the slurry, the computer operates the motor to develop the high vacuum, as previously described, which is applied via the line 142 to the vacuum cone 32. It takes approximately one second for high vacuum to be developed and such operation continues for a sufficiently long duration to enable the slurry in the dip pan to be drawn completely up into the lower portion of the substrate. The purpose of loading the slurry using two levels of vacuum is to avoid "spiking" of the coating slurry in the interior passageways of the substrate. Spiking is a phenomenon which occurs when the initial vacuum applied is too high and the slurry is therefore not drawn uniformly up into the cells of the substrate. A more detailed explanation is provided in copending patent application Ser. No. 596,993 to which reference was made above.

After all of the slurry in the dip pan 30 has loaded into the substrate, the vertical lead screw 120 is again operated to drive the vertical carriage 110 and the clamp 24 upwardly and away from the dip pan. Even as this occurs, however, the vacuum cone 32 continues to be engaged with the clamp and connected to the high vacuum source. In this manner, air is drawn through the substrate to thereby draw the slurry which has just been deposited at the lower end of the substrate deeper into the interior thereof and to coat evenly all the cells of the substrate. This continued application of high vacuum to the substrate is referred to as a "spreading" or "distribution" step and continues for approximately 3 to 4 seconds, substantially the duration required for the clamp to reach a dwell position. The clamp is raised for this operation in order to permit rotation of the substrate as will be described below and to eliminate any obstruction that the dip pan or other equipment in its vicinity would create preventing the flow of air into the lowermost end of the substrate. Simultaneously, a second charge of slurry, destined to be loaded through the opposite end of the substrate, is dispensed and received within the cavity 84 of the dip pan 30.

Upward movement of the clamp 24 and the vacuum cone 30 as a unit is terminated when a limit switch 164 on the vertical carriage 110 engages a cam 165 fixed on the carriage 108. When the spreading or distribution step has been completed, approximately 5 to 10 seconds after initiation of the high vacuum operation, the cone 32 is disengaged from the upper end of the clamp and continues to be raised until it actuates the limit switch 145 (FIG. 4) as previously described and comes to rest at its home position. As the vacuum cone 32 retreats to its home position, the computer 78 deactivates the motor thereby eliminating the presence of vacuum at the vacuum cone.

At this point, both ends of the substrate are clear, respectively, of the dip pan 30 and of the vacuum cone 32 enabling the next step to be performed, that is, the 180° rotation of the substrate. When rotated, the ends of the substrate are reoriented, the previous lower end now being an upper end and the previous upper end now being a lower end. The clamp 24 and its supported substrate are moved and held in the new position by the actuator 130, the lug 132 now engaging the stop member 136. The clamp continues to be held in that position by the actuator 130 until the computer 78 instructs it to return to its original position at a later time in the process.

With the uncoated end of the substrate now being in position to descend to the dip pan 30, the computer 78 again takes over operation of the system to move the substrate downwardly toward the cavity 84. The procedure previously described with respect to loading of the first end of the substrate is now repeated with second end. Upon the completion of the loading and drying steps with respect to this second end of the substrate, the clamp 24 together with the vacuum cone 32 is once again raised to its uppermost position over the dip pan 30, its upward movement again terminated by reason of the limit switch 164. Thereafter, the vacuum cone 32 is disengaged from the clamp 24 and returns to its home position as defined by the limit switch 145.

The limit switch 164 also serves to cause operation of the pneumatic actuator 130 to again rotate the clamp 24, returning the substrate to its original position. Thereupon, the horizontal lead screw 114 is again operated to translate the clamp from a position over the dip pan to a position over the shelf 22. Horizontal movement of the clamp 24 is terminated when a limit switch 166 suitably mounted on the carriage 108 engages a cam 167 fixed to the framework 64. See FIGS. 3 and 4. This, in turn, activates the vertical lead screw 120 to lower the clamp 24 and, with it, the substrate such that its lower end is returned to the shelf with its original orientation. As this occurs, a limit switch 168 mounted on the carriage 110 (FIGS. 3 and 4) engages a cam 170 fixed on the carriage 110 which serves to deenergize the system 20 and all of its subsystems. With the lower end of the substrate received on the shelf 22, pressure to the gasket 102 is removed enabling the gasket 102 to deflate and be withdrawn from engagement with the substrate. The operator can then remove the coated substrate from the clamp and put an uncoated substrate back into the clamp for another cycle of the loading process. The entire procedure as described for coating of a single substrate takes approximately 30 to 40 seconds of time.

While a preferred embodiment of the invention has been disclosed in detail, it should be understood by those skilled in the art that various modifications may be made to the illustrated embodiment without departing from the spirit and the scope thereof as described in the specification and defined in the appended claims.

We claim:

1. A process for applying a predetermined amount of catalyst to the interior surfaces of a hollow substrate comprising the steps of:

introducing a predetermined amount of catalyst slurry into the cavity of a dip pan having a bottom;

lowering a hollow substrate having first and second open ends and interior surfaces to be coated such that a first end is received in the cavity of the dip pan and fully immersed in the slurry;

maintaining the substrate at a height such that the first end thereof is located at a predetermined distance above the bottom of the cavity in the dip pan;

applying a vacuum from a source to the second end of the substrate to draw all of the slurry contained in the dip pan upwardly into the substrate for coating the interior surfaces thereof; and continuing to apply vacuum for a predetermined period of time to the second end of the substrate after all of the slurry has been drawn out of the dip pan and into the substrate for drying the coating formed on the substrate.

2. A process as set forth in claim 1 comprising the additional steps of:

raising the substrate to a dwell height such that the ends thereof clear, respectively, the dip pan and the source of the vacuum;

rotating the substrate to reverse the relative positions of the first and second ends thereof;

again introducing a predetermined amount of slurry into the cavity of the dip pan;

lowering the substrate so that the second end is received in the cavity of the dip pan and immersed in the slurry;

maintaining the substrate at a height such that the second end thereof is located at a predetermined distance above the bottom of the cavity in the dip pan;

applying a vacuum from the source to the first end of the substrate to draw all of the slurry within the dip pan upwardly into the substrate for coating the interior surface thereof; and continuing to apply vacuum for a predetermined period of time to the first end of the substrate after all of the slurry has been drawn out of the dip pan and into the substrate for drying the coating formed on the substrate.

3. A process as set forth in claim 2 comprising the additional steps of:

withdrawing the source of the vacuum from the first end of the substrate;

again raising the substrate to a dwell height such that the ends thereof clear, respectively, the dip pan and the source of the vacuum; and rotating the substrate to return the first and second ends thereof to their original relative orientation.

4. A process for applying a predetermined amount of catalyst to the interior surfaces of a hollow substrate comprising the steps of:

introducing a predetermined amount of catalyst slurry into the cavity of a dip pan having a bottom;

lowering a hollow substrate having first and second open ends and interior surfaces to be coated such that a first end is received in the cavity of the dip pan and fully immersed in the slurry;

maintaining the substrate at a height such that the first end thereof is located at a predetermined distance above the bottom of the cavity in the dip pan;

applying a low initial vacuum and subsequently a high vacuum from a source to the second end of the substrate to draw all of the slurry contained in the dip pan upwardly into the substrate for coating the interior surfaces thereof; and continuing to apply a high vacuum for a predetermined period of time to the second end of the substrate after all of the slurry has been drawn out of the dip pan and into the substrate for drying the coating formed on the substrate.

5. A process for applying a predetermined amount of catalyst to the interior surfaces of a hollow substrate comprising the steps of:

transferring from an initial position a hollow substrate having first and second open ends and interior surfaces to be coated such that the first end advances towards the cavity of the dip pan adapted to receive therein the first end for full immersion thereof in a catalyst slurry which has been introduced in the cavity;

sensing the orientation of the substrate relative to the dip pan as the first end thereof passes through a plane positioned above the cavity and transverse to the path of travel of the substrate;

interrupting the transfer of the substrate toward the cavity of the dip pan in the event the substrate is so oriented that the first end cannot properly enter the cavity for immersion in the slurry; and returning the substrate to the initial position after interrupting the transfer of the substrate toward the cavity of the dip pan.

6. A process for applying a predetermined amount of catalyst to the interior surfaces of a hollow substrate comprising the steps of:

introducing a predetermined amount of catalyst slurry into the cavity of a dip pan having a bottom;

transferring from an initial position a hollow substrate having first and second open ends and interior surfaces to be coated such that the first end advances towards the cavity of the dip pan adapted to receive therein the first end for full immersion thereof into the catalyst slurry;

sensing the presence of the substrate as the first end thereof passes through a plane positioned above the cavity and lying transverse to the path of travel of the substrate;

terminating movement of the substrate when the first end thereof reaches an operative position a predetermined distance above the bottom of the cavity and fully immersed in the catalyst slurry.

7. A process for applying a predetermined amount of catalyst to the interior surfaces of a hollow substrate comprising the steps of:

introducing a first predetermined amount of catalyst slurry into the cavity of a dip pan;

lowering a hollow substrate having first and second open ends and interior surfaces to be coated such that a first end is received in the cavity of the dip pan and fully immersed in the slurry;

applying a vacuum to the second end of the substrate to draw all of the slurry contained in the dip pan upwardly into the substrate through the first end for coating the interior surfaces thereof;

withdrawing the source of the vacuum from the second end of the substrate;

raising the substrate to a dwell height such that the ends thereof clear, respectively, the dip pan and the source of the vacuum;

rotating the substrate to reverse the relative positions of the first and second ends thereof;

introducing a second predetermined amount of slurry into the cavity of the dip pan;

lowering the substrate so that the second end thereof is received in the cavity of the dip pan and fully immersed in the slurry; and applying a vacuum to the first end of the substrate to draw all of the slurry contained in the dip pan upwardly into the substrate through the second end for coating the interior surfaces thereof.

8. A process for introducing a predetermined amount of catalyst slurry into a dip pan for use in coating the interior surfaces of a hollow substrate comprising the steps of:

causing flow of the slurry from a reservoir into a bladder means; continuously weighing the bladder means as slurry is received therein;

terminating flow of the slurry into the bladder means when the weight of the slurry therein reaches a predetermined magnitude; and subsequently releasing all of the slurry in the bladder means and causing it to flow into the dip pan in preparation for coating the interior surfaces of the substrate.

9. A process for introducing a predetermined amount of catalyst slurry into a dip pan for use in coating the interior surfaces of a hollow substrate comprising the steps of:

causing flow of the slurry from a reservoir into a bladder means;

terminating flow of the slurry into the bladder means when the volume of the slurry therein reaches a predetermined magnitude; and subsequently releasing all of the slurry in the bladder means and causing it to flow into the dip pan in preparation for coating the interior surfaces of the substrate.

10. A process as set forth in claim 1 wherein the predetermined amount called for in the step of introducing catalyst slurry into the cavity of the dip pan is a predetermined volume of the slurry.

11. A process as set forth in claim 1 wherein the predetermined amount called for in the step of introducing catalyst slurry into the cavity of the dip pan is a predetermined weight of the slurry.

12. A process for applying a predetermined amount of catalyst to the interior surfaces of a hollow substrate comprising the steps of:

placing a substrate to be coated onto a platform within the confines of a clamp selectively operable to firmly engage and support the substrate;

operating the clamp to firmly engage and support the substrate;

raising the clamp and supported substrate above the platform to a first dwell position;

translating the clamp and supported substrate to a second dwell position in vertical alignment with and between a vacuum cone and a dip pan having a cavity for receiving catalyst slurry therein;

introducing a predetermined amount of catalyst slurry into the cavity of the dip pan;

lowering the clamp so that a first end of the supported substrate is received in the cavity of the dip pan;

sensing the presence of the substrate as the first end thereof passes through a plane positioned above the cavity and lying transverse to the path of travel of the substrate;

terminating movement of the clamp when the first end of the substrate reaches an operative position a predetermined distance above the bottom of the cavity and is immersed in the catalyst slurry;

simultaneously with the step of lowering the clamp, lowering the vacuum cone into sealing engagement with a second end of the substrate opposite the first end thereof when the first end is at the operative position;

applying a vacuum to the vacuum cone to draw the catalyst slurry in the cavity completely into the first end of the substrate in order to coat the interior surfaces thereof nearest the first end;

continuing for a predetermined period to apply vacuum to the vacuum cone while raising the clamp, the substrate, and the vacuum cone as a unit to the second dwell position at which the first end is clear of obstruction with the dip pan thereby drying the coating of the catalyst slurry on the interior surfaces of the substrate;

discontinuing the application of vacuum to the vacuum cone;

withdrawing the vacuum cone to a retracted position distant from the clamp and the substrate;

rotating the clamp about an axis so as to shift the respective positions of the first and second ends of the substrate;

again introducing a predetermined amount of catalyst slurry into the cavity of the dip pan;

lowering the clamp so that the second end of the substrate is received in the cavity of the dip pan;

sensing the presence of the substrate as the second end thereof passes through a plane positioned above the cavity and transverse to the path of travel of the substrate;

terminating movement of the clamp when the second end of the substrate reaches an operative position a predetermined distance above the bottom of the cavity and is fully immersed in the catalyst slurry;

simultaneously with the step of lowering the clamp, again lowering the vacuum cone into sealing engagement with the first end of the substrate when the second end is at the operative position;

applying a vacuum to the vacuum cone to draw the catalyst slurry in the cavity completely into the second end of the substrate in order to coat the interior surfaces thereof nearest the second end;

continuing for a predetermined period to apply vacuum to the vacuum cone while raising the clamp, the substrate, and the vacuum cone as a unit to the second dwell position thereby drying the coating of the catalyst slurry on the interior surfaces of the substrate;

discontinuing the application of vacuum to the vacuum cone;

withdrawing the vacuum cone to a retracted position distant from the clamp and the substrate;

again rotating the clamp about an axis so as to shift the respective positions of the first and second ends of the substrate;

translating the clamp and supported substrate for return to the first dwell position;

lowering the clamp so that the first end is again brought to rest onto the platform; and disengaging the clamp from the substrate.

13. Apparatus for applying a predetermined amount of catalyst to the interior surfaces of a hollow substrate comprising:

clamp means firmly engaging and supporting a hollow substrate having opposed open first and second ends;

a dip pan having a cavity with a bottom for holding a predetermined amount of catalyst slurry therein and adapted to receive therein an end of the substrate;

first drive means for moving said clamp means upwards and downwards along a generally upright path aligned with the cavity of said dip pan; and control means for controlling movement of said first drive means along said upright path and including sensing means for detecting the presence of a first end of the substrate as it approaches said dip pan when said clamp and supported substrate are moved downwardly along said upright path, said control means being operable to terminate downward movement of said first drive means when the first end of the substrate reaches a position fully immersed in the slurry and located a predetermined distance above the bottom of said dip pan.

14. Apparatus as set forth in claim 13 including a vacuum cone and a conduit operatively connecting said vacuum cone to a source of vacuum, said vacuum cone having an open end movable between a retracted position distant from the second end of the substrate and an extended position for sealingly enveloping the second end of the substrate when the first end of the substrate is immersed in the slurry.

15. Apparatus as set forth in claim 14 wherein said vacuum cone is engagable with said clamp for sealingly enveloping the second end of the substrate and includes sealing means for effectively sealing the interface between said vacuum cone and said clamp when they are engaged.

16. Apparatus as set forth in claim 15 wherein said vacuum cone is bell shaped and terminates at a rim, said sealing means being a continuous gasket mounted on said rim and engageable with said clamp whereby a broad range of sizes of substrates can be accommodated.

17. Apparatus as set forth in claim 14 including second drive means for moving said vacuum cone between said retracted and extended positions, said control means being effective to operate said first and second drive means such that said vacuum cone sealingly envelopes the second end of the substrate at substantially the same time that the substrate on said clamp enters the slurry in said dip pan.

18. Apparatus as set forth in claim 14 wherein said source of vacuum is selectively operable alternatively at a low level of vacuum and at a high level of vacuum and wherein said control means is effective to initially operate said source at said low level when said vacuum cone first sealingly envelopes said substrate and at said high level after said vacuum cone has sealingly enveloped said substrate for a predetermined period of time.

19. Apparatus as set forth in claim 18 wherein said control means is operable for selectively applying a low vacuum to said vacuum cone when said vacuum cone initially sealingly envelopes the substrate, then for applying a high vacuum to said vacuum cone after said vacuum cone has sealingly enveloped the substrate for a predetermined period of time, and for preventing the application of said high vacuum to said vacuum cone when said vacuum cone is withdrawn from the substrate.

20. Apparatus as set forth in claim 18 wherein said control means is operable for selectively applying a high volume to said vacuum cone after said vacuum cone has sealingly enveloped the substrate for a predetermined period of time, and for terminating the application of said high vacuum to said vacuum cone when said vacuum cone is withdrawn from the substrate.

21. Apparatus as set forth in claim 20 wherein said control means is operable to move as a unit to a dwell position said clamp and said vacuum cone while said vacuum cone still sealingly envelopes the second end of the substrate such that the substrate is clear of said dip pan and after passage of another predetermined period of time to operate said second drive means to withdraw said vacuum cone from the second end of the substrate and to move said vacuum cone to the retracted position.

22. Apparatus as set forth in claim 21 wherein said control means is operable to move said clamp to a dwell height such that the ends of the substrate clear said vacuum cone and said dip pan in said retracted position and including means for rotating said clamp to thereby reverse the relative positions of the first and second ends of the substrate, said control means being operable to rotate said clamp when said clamp attains said dwell height.

23. Apparatus as set forth in claim 18 wherein said source of vacuum includes a vacuum pump operable across a broad range of speeds to generate a broad range of vacua as a function of speed, and a variable speed motor for driving said vacuum pump whereby operation of said motor at a low speed causes said vacuum pump to generate a low vacuum and whereby operation of said motor at a high speed causes said vacuum pump to generate a high vacuum.

24. Apparatus for applying a predetermined amount of catalyst to the interior surfaces of a hollow substrate having opposed open first and second ends comprising:
  clamp means firmly engaging and supporting the hollow substrate;
  a dip pan having a cavity with a bottom for holding a predetermined amount of catalyst slurry therein and adapted to receive therein an end of the substrate for immersion in the slurry;
  first drive means for moving said clamp means upward and downwards along a generally upright path aligned with the cavity of said dip pan;
  control means for controlling movement of said first drive means along said upright path and including sensing means for sensing the presence and orientation of the substrate relative to said dip pan as an end of the substrate passes downwardly through a plane positioned above the cavity and transverse to the path of travel of the substrate;
  said control means being operable to permit continued movement of said clamp when the orientation of the substrate is such as to assure that the end thereof will be properly received within the cavity of said dip pan, said control means being operable to terminate operation of said first drive means and therefore downward movement of the substrate when the end thereof reaches an operative position a predetermined distance above the bottom of the cavity and fully immersed in the slurry.

25. Apparatus as set forth in claim 24 wherein said control means interrupts the operation of said first drive means moving said clamp downwardly toward said dip pan when the orientation of the substrate is such that the substrate will not be properly received within the cavity of said dip pan for immersion in the slurry.

26. Apparatus as set forth in claim 24 wherein said sensing means includes at least one signal emitting source and at least one associated detector spaced from said source and positioned such that said upright path lies intermediate said source and said detector, passage of the substrate between said source and said detector being effective to interrupt the signal from said source to thereby indicate the presence of the substrate.

27. Apparatus as set forth in claim 24 wherein said sensing means includes first and second signal emitting sources and first and second associated detectors spaced therefrom such that the signals emitted and received by each of said sensing means lie transverse to one another and to said upright path, said sensing means positioned such that said upright path lies intermediate each of said sources and detectors, passage of a substrate being effective to interrupt the signal from each of said sources simultaneously to thereby indicate the presence of the substrate and being effective to interrupt the signal from each of said sources sequentially to thereby indicate an improper orientation of the substrate.

28. Apparatus as set forth in claim 25 including:
  a shelf distant from said dip pan and adapted to supportively receive a substrate thereon; and
  third drive means operable by said control means for laterally moving said clamp between a position aligned with said shelf and a position aligned with said dip pan;
  said control means, in sequence, causing said first drive means to move said clamp upwardly to a dwell position above said dip pan and distant therefrom, then causing said third drive means to move said clamp laterally to said position aligned with said shelf, then causing said first drive means to move said clamp downwardly for placing the substrate on said shelf.

29. Apparatus for applying a predetermined amount of catalyst to the interior surfaces of a hollow substrate having opposed open ends comprising:
  a dip pan having a cavity with a bottom and sides for holding a predetermined amount of catalyst slurry therein and adapted to receive therein an end of the substrate;
  a reservoir for containing the catalyst slurry at a location distant from said dip pan;
  conduit means extending between said reservoir and said dip pan for directing flow of the catalyst slurry from said reservoir to said dip pan; and
  delivery means selectively operable for causing flow of the catalyst slurry from said reservoir to said dip pan.

30. Apparatus as set forth in claim 29 wherein said delivery means includes an adjustable metering pump for delivering to said dip pan a predetermined volume of the catalyst slurry.

31. Apparatus as set forth in claim 30 wherein said delivery means include bladder means for selectively delivering to said dip pan a predetermined weight of the catalyst slurry.

32. Apparatus as set forth in claim 29 including:
  control means for operating a plurality of functions of said apparatus according to a predetermined sequence and timing; and wherein said delivery means includes:

a bladder adapted to receive a charge of the catalyst slurry therein for eventual introduction into said dip pan;

a first normally closed solenoid valve for controlling flow of the slurry into said bladder, said first solenoid valve being operable by said control means to move to the open position for a predetermined period of time to allow flow of the slurry into said bladder;

measuring means for weighing the amount of slurry in said bladder and including signal means for continuously generating and transmitting to said control means a signal representative of the weight of the catalyst slurry in said bladder; and a second normally closed solenoid valve for controlling flow of the slurry out of said bladder and into said dip pan, said second solenoid valve being responsive to said control means when the weight of the slurry in said bladder reaches a predetermined weight to move to the open position to thereby allow flow of the slurry from said bladder to said dip pan.

33. Apparatus as set forth in claim 32 wherein said measuring means includes a platform operable to generate a signal representative of a load received thereon and wherein said delivery means includes a housing for supporting said bladder, said platform adapted to receive said housing thereon.

34. Apparatus as set forth in claim 29 wherein said delivery means includes:

a bladder adapted to receive a charge of the catalyst slurry therein for eventual introduction into said dip pan;

control means for operating a plurality of functions of said apparatus according to a predetermined sequence and timing;

support means for said bladder including a housing having a base member and an aperture extending therethrough, a load cell within said housing, resilient means mounting said load cell for limited movement relative to said base member, a substantially vertically disposed connecting rod extending through the aperture and fixed at one end to said load cell and at its other end to said bladder, bearing means on said base member within the aperture permitting axial movement of said connecting rod relative to said base member;

said load cell being responsive to the weight of slurry in said bladder and including signal means for continuously generating and transmitting to said control means a signal representative of the weight of the slurry in said bladder; and a first normally closed solenoid valve for controlling flow of the slurry into said bladder, said first solenoid valve being operable by said control means to move to the open position to allow flow of the slurry into said bladder and responsive to said control means to move to the closed position to stop the flow of slurry into said bladder when the slurry within said bladder reaches a predetermined weight.

35. Apparatus as set forth in claim 29 wherein said delivery means includes:

a bladder adapted to receive a precise charge of the catalyst slurry therein from said reservoir for eventual introduction into said dip pan;

control means for operating a plurality of functions of said apparatus according to a predetermined sequence and timing;

support means for said bladder including a fixed knife edge directed upwardly, an elongated balance arm having first and second opposed ends pivotally mounted on said knife edge intermediate said ends, and mutually engaging means adjacent said first end and on said bladder for mounting said bladder thereon;

counter balance means biasing said second end of said balance arm for offsetting the empty weight of said bladder;

a load cell engageable with said second end of said balance arm for detecting the weight of the slurry as it is introduced into said bladder and including signal means for continuously generating and transmitting to said control means a signal representative of the weight of the slurry in said bladder;

a first normally closed feed valve for controlling the flow of the slurry into said bladder, said first feed valve being operable by said control means to move to the open position to allow flow of the slurry into said bladder and responsive to said control means to move to the closed position to stop the flow of slurry into said bladder when th slurry within said bladder reaches a predetermined weight as detected by said load cell.

36. Apparatus as set forth in claim 35 wherein said counter balance means includes at least one counter weight releasably mounted to said second end.

37. Apparatus as set forth in claim 35 wherein the linear distance between a center of gravity of said bladder to said knife edge is much greater than the linear distance between said knife edge and the location at which said load cell engages said second end of said balance arm.

38. Apparatus as set forth in claim 35 wherein said bladder has an upper end and an intake line for the slurry connected to said upper end, said first feed valve being operable to control the flow of the slurry from said reservoir into said bladder via the intake line, and wherein said bladder has a lower end and an outlet line attached to said lower end for directing flow of the slurry to said dip pan;

said apparatus including a second normally closed feed valve in said outlet line for controlling the flow of the slurry out of said bladder upon signal from said control means.

39. Apparatus as set forth in claim 35 wherein said mutually engaging means include a defined recess adjacent said first end and a fastener with an enlarged portion mounted on said bladder and spaced from the surface thereof, said enlarged portion being engageably received within said recess to thereby suspend said bladder from said balance arm.

40. Apparatus as set forth in claim 39 wherein said fastener is a screw threadedly engaged with said bladder, said screw having a head engageably received within said recess to thereby suspend said bladder from said balance arm.

41. Apparatus as set forth in claim 39 wherein said bladder has a top end to which said fastener is mounted and a lower end and wherein said support means includes a bracket attached to said balance arm and depending therefrom adjacent said first end and a support ring fixed to said bracket distant from said first end and adapted to loosely supportingly receive said lower end thereon.

42. Apparatus as set forth in claim 29 wherein said reservoir is a tank including a bottom and having an outlet in the bottom connected to said conduit means, said bottom being sloped in the direction of the outlet to direct the flow of the slurry toward said conduit means.

43. Apparatus as set forth in claim 29 wherein said dip pan, said reservoir, and said conduit means are formed of substantially non-wettable material.

44. Apparatus as set forth in claim 29 wherein said reservoir includes a cooling jacket for receiving fluid for controlling the temperature of the slurry received therein.

45. Apparatus as set forth in claim 29 including an agitator in said reservoir for maintaining the uniform suspension of the solids within the catalyst slurry.

46. Apparatus for applying a predetermined amount of catalyst to the interior surfaces of a hollow substrate comprising:

clamp means firmly engaging and supporting a hollow substrate having opposed open first and second ends;

a dip pan having a cavity with a bottom for holding a predetermined amount of catalyst slurry therein and adapted to receive therein an end of the substrate;

drive means for moving said clamp means upwards and downwards along a generally upright path aligned with the cavity of said dip pan;

vacuum means for applying a vacuum to the second end of the substrate when said drive means has advanced the substrate such that the first end thereof is fully immersed in the slurry and for applying a vacuum to the first end of the substrate when said drive means has advanced the substrate such that the second end thereof is fully immersed in the slurry; and index means for rotating said clamp means to thereby reverse the relative positions of the first and second ends of the substrate.

47. Apparatus as set forth in claim 46 wherein said clamp means includes a body having a substrate receiving opening extending therethrough, an inflatable gasket member sealingly mounted on said body and encircling the opening; and a fitting for selectively introducing pressurized gas into said gasket for engaging a substrate extending through the opening; and wherein said index means includes a rotary index are fixed on said drive means and extending outwardly therefrom generally in the direction of said dip pan, an extension member integral with said clamp means and rotatably mounted on said index arm for positioning said clamp means above said dip pan and enabling rotation thereof between one position at which the first end of a substrate supported by said clamp means is receivable in the cavity of said dip pan and another position at which the second end of the substrate is receivable in the cavity of said dip pan;

limit means on said index arm and on said extension member respectively, for defining said one position and said other position of said extension member; and actuating means mounted on said index arm for rotating said clamp means between said positions defined by said limit means.

48. Apparatus as set forth in claim 47 wherein said extension member is cylindrical and wherein said limit means includes a lug extending radially outwardly therefrom and a pair of stop members fixed to said index arm at diametrically opposed locations to either side of said extension member, said lug being engagable with one of said stop members to define said one position of said clamp means and being engagable with the other of said stop members to define said other position of said clamp means.

49. Apparatus as set forth in claim 46 wherein said clamp means includes a body having a substrate receiving opening extending therethrough and including means for releasably engaging the substrate; and wherein said index means includes a rotary index arm fixed on said drive means and extending outwardly therefrom in the direction of said dip pan, an extension member integral with said clamp means and rotatably mounted on said index arm for positioning said clamp means above said dip pan and enabling rotation thereof between one position at which the first end of a substrate supported by said clamp means is receivable in the cavity of said dip pan and another position at which the second end of the substrate is receivable in the cavity of said dip pan;

limit means on said index arm and on said extension member, respectively, for defining said one position and said other position of said extension member; and actuating means mounted on said index arm for rotating said clamp means between said positions defined by said limit means.

* * * * *

UNITED STATES PATENT AND TRADEMARK OFFICE
CERTIFICATE OF CORRECTION

PATENT NO. : 4,609,563

DATED : September 2, 1986

INVENTOR(S) : Thomas Shimrock et al.

It is certified that error appears in the above-identified patent and that said Letters Patent is hereby corrected as shown below:

Column 11, line 63, "approximately" should read -- appropriately --.

Column 13, line 42, "11" should read -- 110 --.

Column 14, line 40, after "has" insert -- been --.

Signed and Sealed this

Third Day of March, 1987

Attest:

DONALD J. QUIGG

Attesting Officer

Commissioner of Patents and Trademarks